(12) United States Patent
Ozaki

(10) Patent No.: US 8,149,523 B2
(45) Date of Patent: Apr. 3, 2012

(54) IMAGE PICKUP LENS, IMAGE PICKUP APPARATUS AND MOBILE TERMINAL

(75) Inventor: Yuichi Ozaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/549,756

(22) Filed: Aug. 28, 2009

(65) Prior Publication Data

US 2010/0060996 A1 Mar. 11, 2010

(30) Foreign Application Priority Data

Sep. 5, 2008 (JP) ................................. 2008-228074

(51) Int. Cl.
 *G02B 9/34* (2006.01)
(52) U.S. Cl. ....................................... 359/773; 359/715
(58) Field of Classification Search .................. 359/708, 359/713–715, 754–757, 763, 764, 766, 771, 359/773; 369/112.01–112.29
See application file for complete search history.

(56) References Cited

U.S. PATENT DOCUMENTS

| 7,755,854 B2* | 7/2010 | Sano ............................. 359/773 |
| 7,859,771 B2* | 12/2010 | Yin et al. ...................... 359/773 |
| 2007/0014033 A1* | 1/2007 | Shinohara .................... 359/692 |
| 2009/0290234 A1* | 11/2009 | Sano et al. .................... 359/715 |
| 2010/0014175 A1* | 1/2010 | Nio .............................. 359/773 |

FOREIGN PATENT DOCUMENTS

| JP | 2002-365530 | 12/2002 |
| JP | 2004-341013 | 12/2004 |

\* cited by examiner

*Primary Examiner* — Darryl J Collins
(74) *Attorney, Agent, or Firm* — Cozen O'Connor

(57) ABSTRACT

An image pickup lens relating to the present invention is a lens for forming an image of a subject onto a photoelectric converter of a solid-state image pickup element. The image pickup lens includes, in order from an object side thereof: an aperture stop; a first lens with a positive refractive power; a second lens in a meniscus shape with a negative refractive power, whose object side surface is a convex surface; a third lens with a positive refractive power; and a fourth lens with a negative refractive power. The image pickup lens satisfies a predetermined conditions relating to a curvature radius of the object side surface of the second lens and an Abbe number of the second lens.

10 Claims, 18 Drawing Sheets

FIG. 6
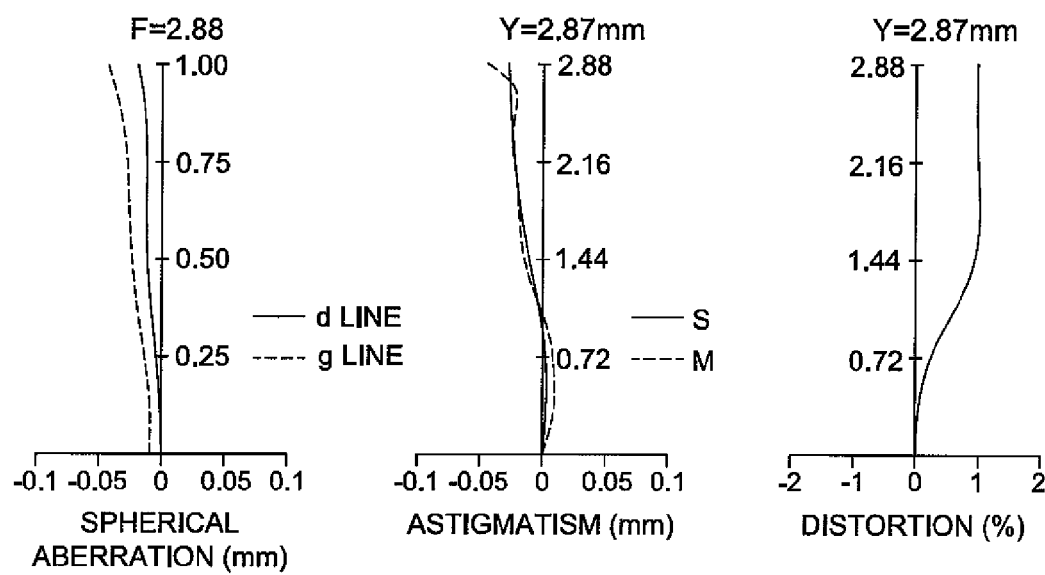
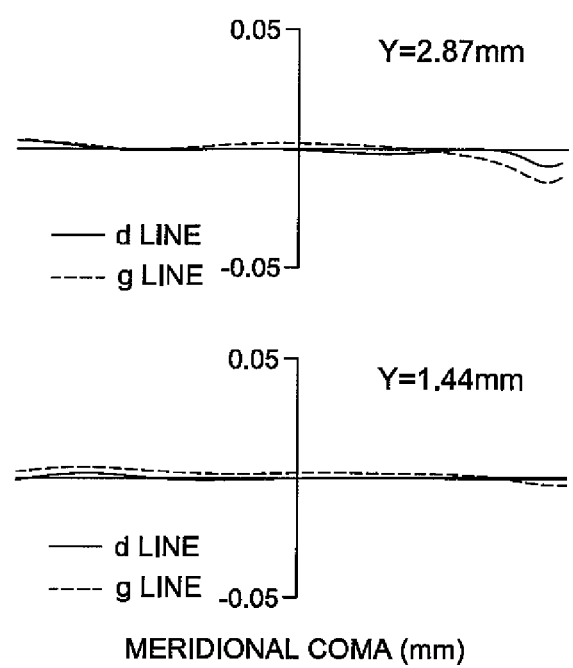

FIG. 8
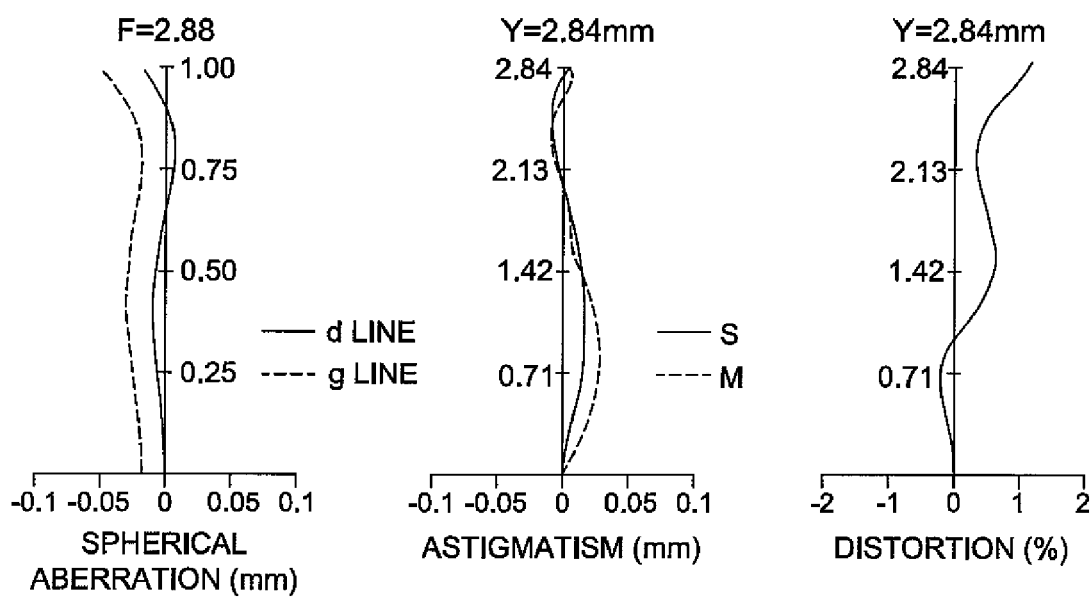
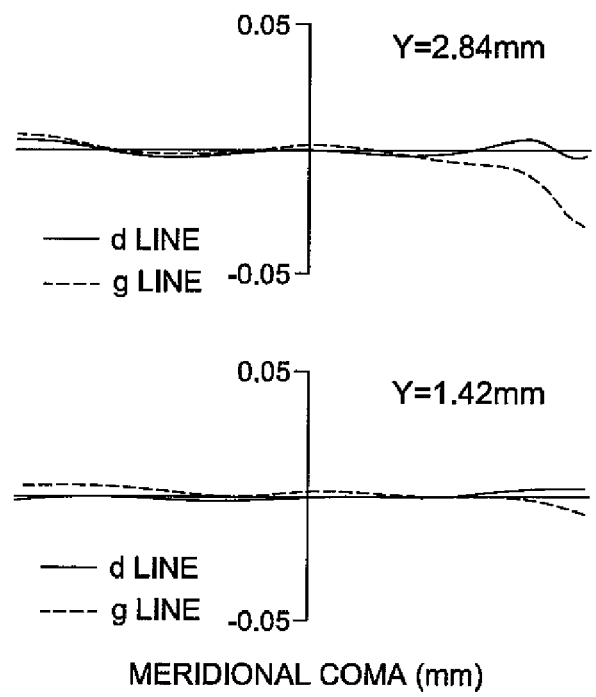
MERIDIONAL COMA (mm)

FIG. 10
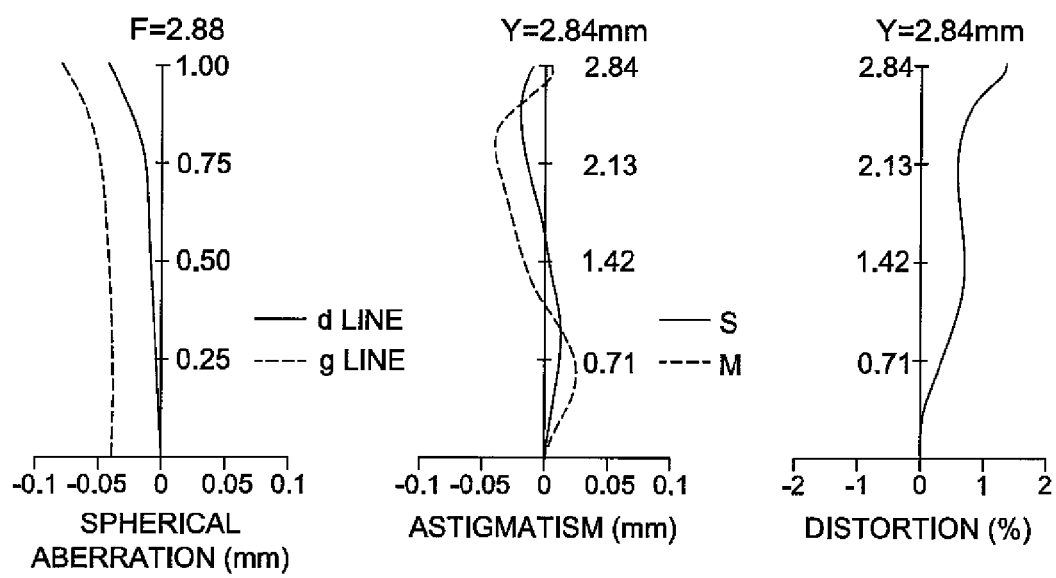
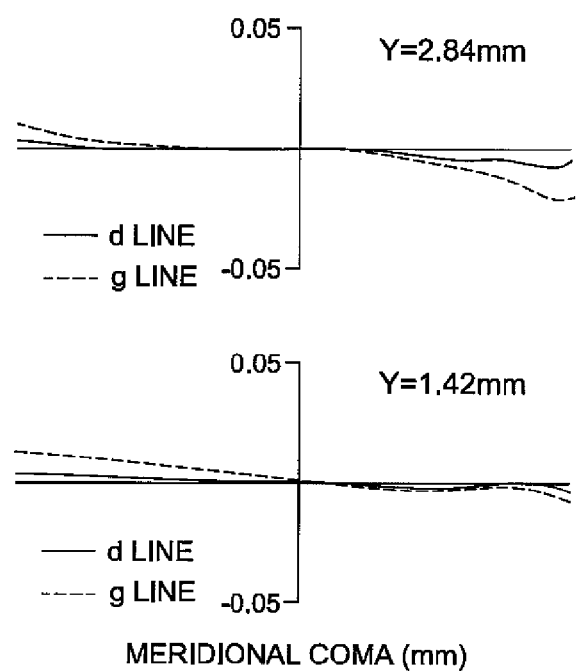
MERIDIONAL COMA (mm)

FIG. 12
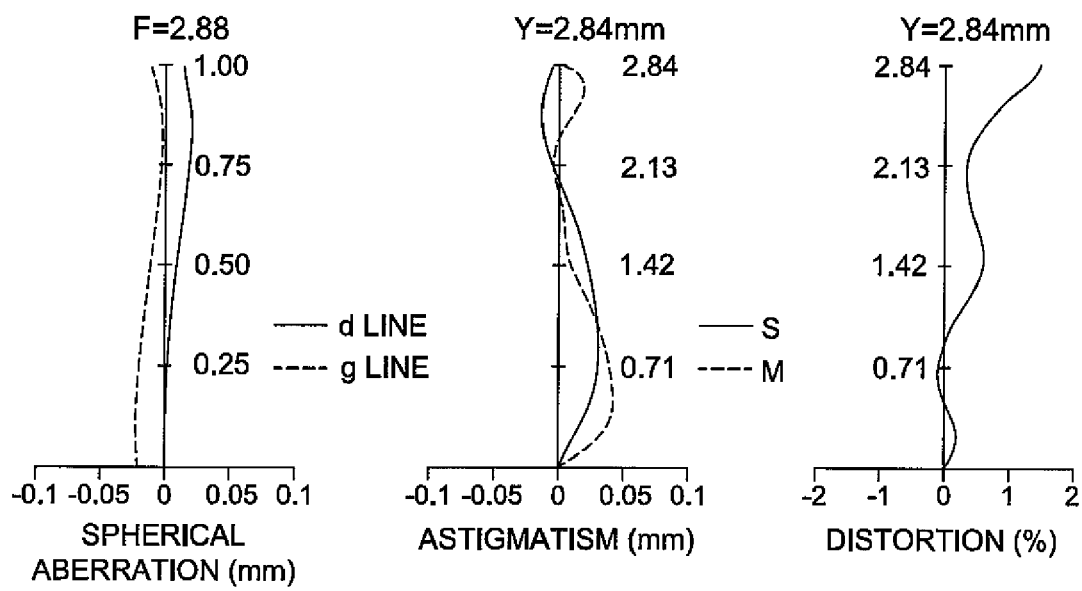
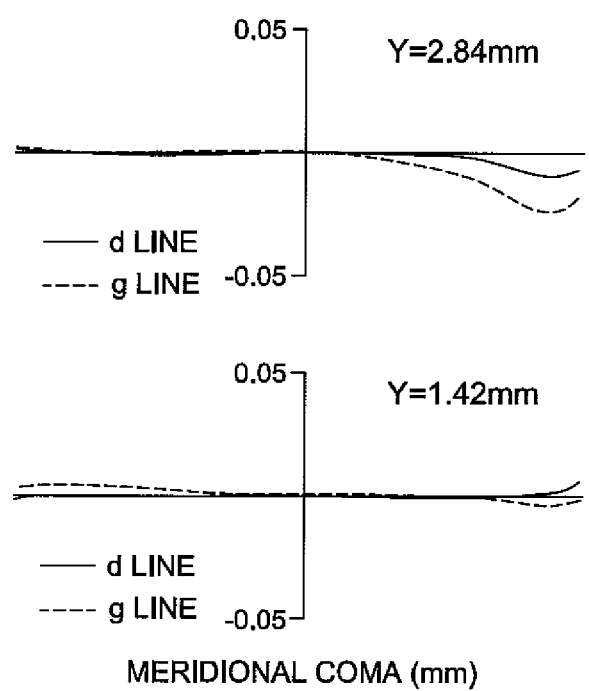
MERIDIONAL COMA (mm)

FIG. 14
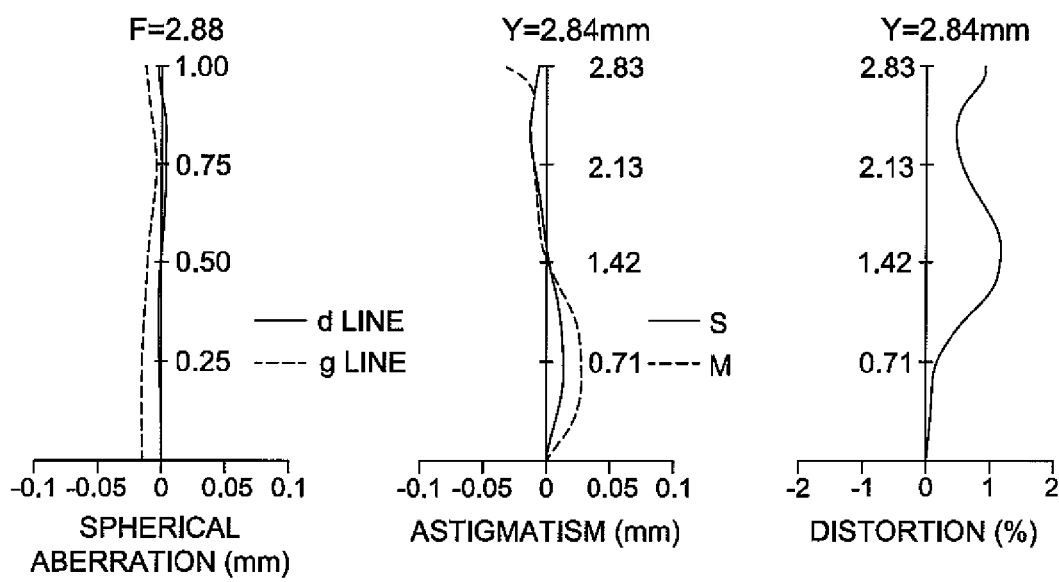
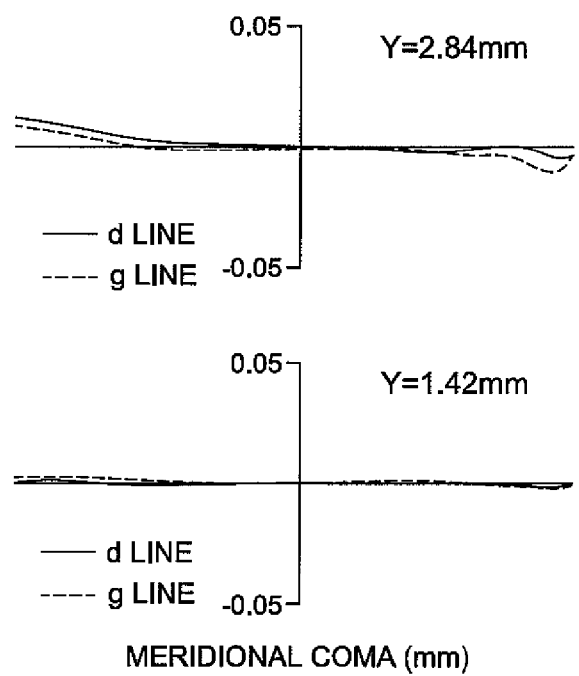
MERIDIONAL COMA (mm)

FIG. 16
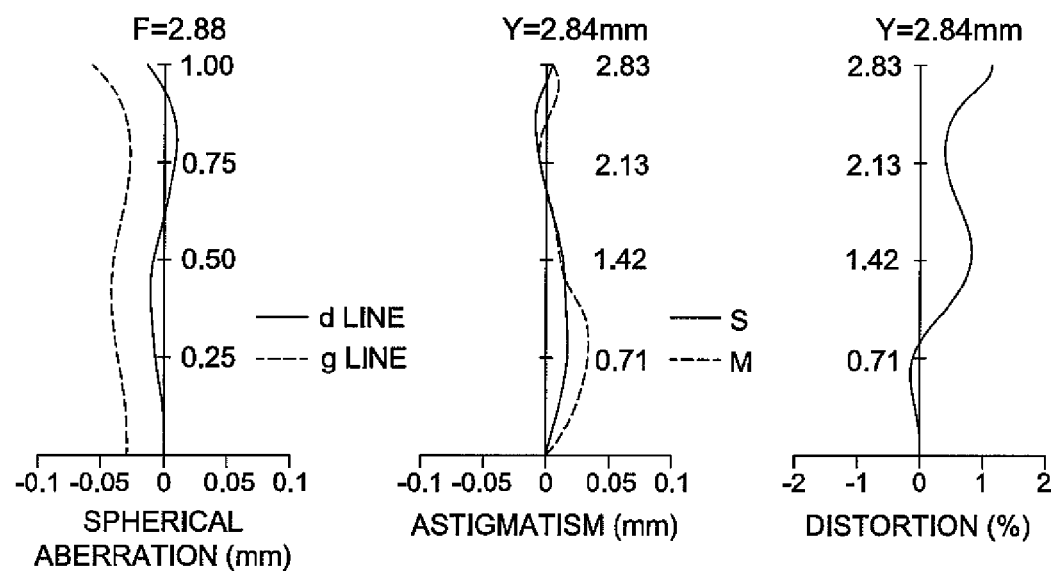
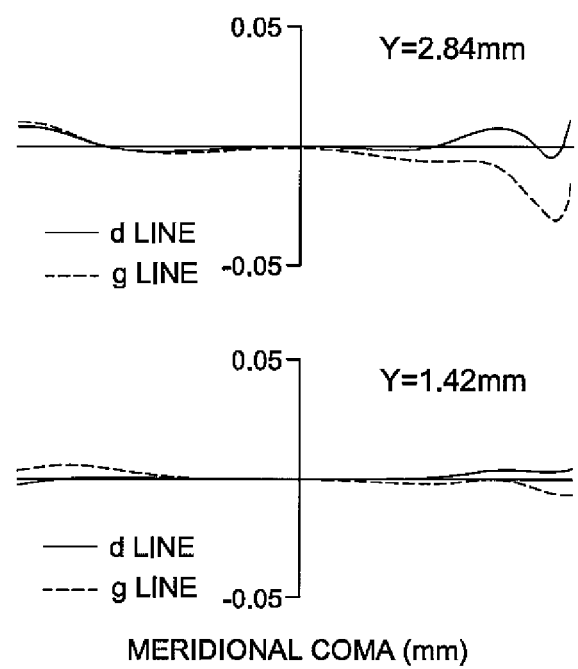
MERIDIONAL COMA (mm)

FIG. 18
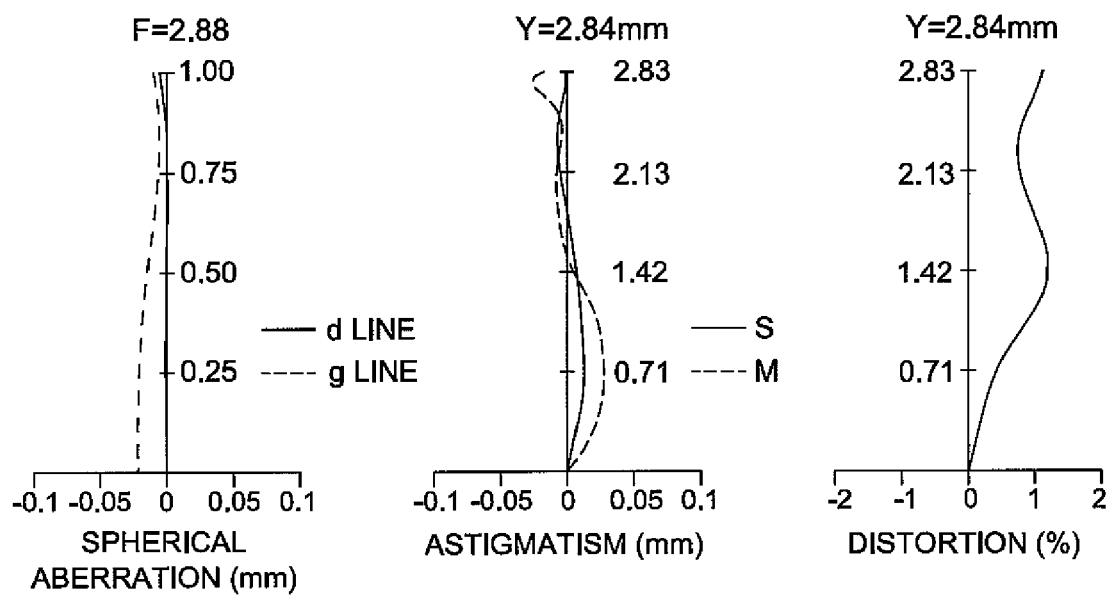
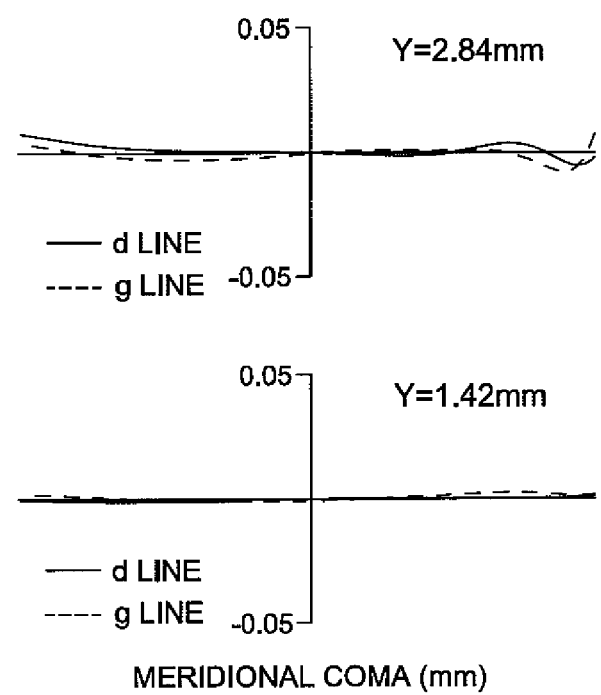

IMAGE PICKUP LENS, IMAGE PICKUP APPARATUS AND MOBILE TERMINAL

This application is based on Japanese Patent Application No. 2008-228074 filed on Sep. 5, 2008, in Japanese Patent Office, the entire content of which is hereby incorporated by reference.

TECHNICAL FIELD

The present invention relates to a small-sized image pickup lens used for a solid-state image pickup element such as a CCD type image sensor or a CMOS type image sensor, and to an image pickup apparatus and a mobile terminal employing the image pickup lens.

BACKGROUND

A cell-phone and a mobile information terminal each employing an image pickup apparatus are coming into wide use, with a trend of enhancing performance and downsizing of an image pickup apparatus employing a solid-state image pickup element such as a CCD (Charged Coupled Device) type image sensor or a CMOS (Complementary Metal Oxide Semiconductor) type image sensor. Furthermore, there are increasing demands for further downsizing for the image pickup lens that is mounted on the image pickup apparatus of this kind.

As an image pickup lens to be used for this purpose, there has been proposed an image pickup lens composed of four elements, because it can provide higher property than a lens composed of two elements or three elements. As an example of the image pickup lens composed of four elements, there has been disclosed a so-called image pickup lens of an inverted Ernostar type that is made up of the first lens having positive refractive power, the second lens having negative refractive power, the third lens having positive refractive power and of the fourth lens having positive refractive power, in this order from the object side, for providing higher property, as described in, for example, Unexamined Japanese Patent Application Publication (JP-A) No. 2004-341013.

As another example of the image pickup lens composed of four elements, there has been proposed a so-called image pickup lens of a telephoto type that is made up of the first lens having positive refractive power, the second lens having negative refractive power, the third lens having positive refractive power and of the fourth lens having negative refractive power in this order from the object side, and is targeted to be short in terms of the total length of the image pickup lens, as described in, for example, JP-A No. 2002-365530.

The image pickup lens described in JP-A No. 2004-341013 is of an inverted Ernostar type in which the fourth lens is a positive lens. A principal point of the optical system is positioned closer to the image side and a length of its back focal length is longer, compared with a telephoto type lens in which the fourth lens is a negative lens. Therefore, this type of image pickup lens is disadvantageous to be downsized. In addition, it provides one lens with a negative refractive power out of the four lenses, which makes the correction of Petzval's sum difficult, resulting in a problem that excellent performance is hardly secured on a peripheral portion of the image.

Further, in the image pickup lens described in JP-A No. 2002-365530, its angle of view is narrow and aberration correction is insufficient. It causes a problem that the image pickup lens hardly copes with a higher-pixel image pickup element because of the deterioration of its optical property, when the total lens length is further shortened.

SUMMARY

In view of the aforesaid problems, there is provided an image pickup lens with four elements wherein various aberrations are properly corrected in spite of its size that is smaller than a conventional type, and further provided an image pickup apparatus and a mobile terminal equipped with the aforesaid image pickup lens.

There is provided an image pickup lens for forming an image of a subject onto a photoelectric converter of a solid-state image pickup element. The image pickup lens comprises, in order from an object side thereof: an aperture stop; a first lens with a positive refractive power; a second lens in a meniscus shape with a negative refractive power, whose object side surface is a convex surface; a third lens with a positive refractive power; and a fourth lens with a negative refractive power. Further, the image pickup lens satisfies the predetermined conditions relating to a curvature radius of the object side surface of the second lens and an Abbe number of the second lens.

These and other objects, features and advantages according to the present invention will become more apparent upon reading of the following detailed description along with the accompanied drawings.

BRIEF DESCRIPTION OF DRAWINGS

Embodiments will now be described, by way of example only, with reference to the accompanying drawings which are meant to be exemplary, not limiting, and wherein like elements numbered alike in several Figures, in which:

FIG. 6 shows aberration diagrams of the image pickup lens in Example 1 including spherical aberration, astigmatism, distortion, and meridional coma, respectively;

FIG. 8 shows aberration diagrams of the image pickup lens in Example 2 including spherical aberration, astigmatism, distortion, and meridional coma, respectively;

FIG. 10 shows aberration diagrams of the image pickup lens in Example 3 including spherical aberration, astigmatism, distortion, and meridional coma, respectively;

FIG. 12 shows aberration diagrams of the image pickup lens in Example 4 including spherical aberration, astigmatism, distortion, and meridional coma, respectively;

FIG. 14 shows aberration diagrams of the image pickup lens in Example 5 including spherical aberration, astigmatism, distortion, and meridional coma, respectively;

FIG. 16 shows aberration diagrams of the image pickup lens in Example 6 including spherical aberration, astigmatism, distortion, and meridional coma, respectively;

FIG. 18 shows aberration diagrams of the image pickup lens in Example 7 including spherical aberration, astigmatism, distortion, and meridional coma, respectively.

DESCRIPTION OF EMBODIMENTS

Figure 1:
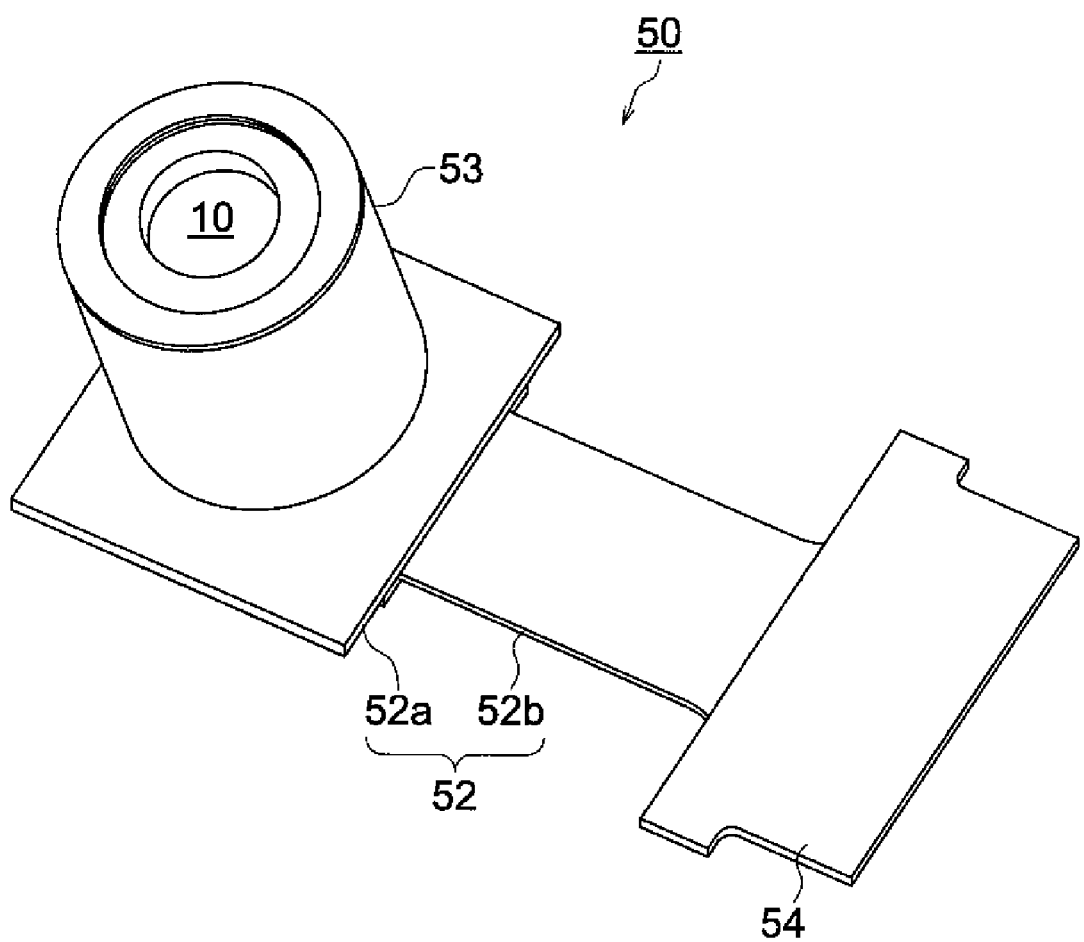
FIG. 1 shows a perspective view of an image pickup apparatus relating to the embodiment of the invention.

Preferred embodiments of the invention will be explained as follows.

One of preferred embodiments of the present invention is an image pickup lens for forming an image of a subject onto a photoelectric converter of a solid-state image pickup element. The image pickup lens comprises, in order from an object side thereof: an aperture stop; a first lens with a positive refractive power; a second lens in a meniscus shape with a negative refractive power, whose object side surface is a convex surface; a third lens with a positive refractive power; and a fourth lens with a negative refractive power.

The image pickup lens satisfies the following conditional expressions.

$$0.4 < r3/f < 0.92 \tag{1}$$

$$15 < v2 < 27 \tag{2}$$

In the expressions, r3 is a curvature radius of the object side surface of the second lens, f is a focal length of a total system of the image pickup lens, and v2 is an Abbe number of the second lens.

A basic construction of the embodiment to obtain a small-sized image pickup lens with aberrations corrected properly, includes an aperture stop, the first lens having positive refractive power, the second lens having negative refractive power, the third lens having positive refractive power, and the fourth lens having negative refractive power, in this order from the object side. By forming the composition of the first lens, the second lens and the third lens in this order from the object side to have a positive composite refractive power, and by forming the fourth lens to have a negative refractive power, it is possible to create a lens construction of the so-called telephoto type which is an advantageous construction for shortening the total length of the image pickup lens.

As for a dimension of a small-sized image pickup lens, downsizing at the level satisfying the following expression is targeted. By satisfying this range, a small size and a light weight of the overall image pickup apparatus can be realized.

$$L/2Y < 1.10 \tag{7}$$

In this expression, L represents a distance along the optical axis from the lens surface closest to the object side to the focal point on the image side in the total image pickup lens system ("the focal point on the image side" means an image point formed when a parallel light beam that is in parallel with the optical axis enters the image pickup lens), and 2Y represents a length of a diagonal line of an image pickup surface of a solid-state image pickup element (a length of a diagonal line of a rectangular effective image pixel area of the solid-state image pickup element).

When a parallel flat plate as an optical lowpass filter, an infrared cut filter and a seal glass of a solid-state image pickup element package is arranged between the lens surface closest to the image side in the image pickup lens and the focal point on the image side, the value of L is calculated with assuming that a space of the parallel flat plate is regarded as a length in terms of air.

As for the expression (7), the following range is preferable.

$$L/2Y < 1.00 \tag{7'}$$

Further, by making two lens elements out of four lens elements in a four-element construction to be negative lenses, it is possible to easily correct the Petzval's Sum by increasing the number of surfaces having light-diverging functions. It enables to obtain an image pickup lens wherein excellent image forming power is secured up to the peripheral portion of an image formed by the image pickup lens. Furthermore, by forming at least one surface of the fourth lens arranged to be closest to the image side in an aspheric shape, various aberrations on the peripheral portion of the image can be corrected.

In addition, by arranging an aperture stop to be closest to the object side, it is possible to arrange an exit pupil in terms of a position to be farther from an image pickup surface, and it is possible to control an incident angle of a principal ray of a light flux that forms an image on the peripheral portion of an image pickup surface of a solid-state image pickup element (an angle formed by a principal ray and an optical axis) to be small. It can secure the so-called telecentricity of the image pickup lens. Further, even when a mechanical shutter is needed, the shutter can be arranged to be closest to the object side, and an image pickup lens having a short total length can be obtained. Further, by forming the second lens into a meniscus shape with a negative refractive power, having a convex surface facing the object side, it is possible to suppress occurrence of coma and astigmatism, while correcting the Petzval' Sum.

Conditional expression (1) stipulates a ratio of a curvature radius of the object side surface of the second lens to the focal length. In this lens construction, coma and astigmatism tend to occur because chromatic aberrations such as longitudinal chromatic aberration and chromatic aberration of magnification are mainly corrected by the second lens that has a negative refractive power. When the value of the conditional expression (1) is lower than the upper limit of the conditional expression (1), the second lens is formed into a strong meniscus shape, and a difference of an incident angle between an upper side marginal ray and a lower side marginal ray of beams passing through an off-axis section becomes small. Thereby, the coma can be corrected effectively. Further, by making a curvature radius of the object side surface of the second lens on to be small, a distance in the peripheral section between the image side surface of the first lens and the object side surface of the second lens can be taken to be wide. Therefore, it easily secures a space for inserting a light-shielding member for preventing unwanted light such as ghost, between the first lens and the second lens. On the other hand, when a value of the conditional expression (1) exceeds the lower limit, it is possible to suppress an increase of positive refractive power of the object side surface of the second lens, and to prevent occurrence of the higher order aberrations such as coma flare caused by an increased negative refractive power of the image side surface of the second lens provided for keeping negative refractive power of the overall second lens.

Conditional expression (2) is one to stipulate Abbe number of the second lens. By satisfying the conditional expression (1), positive refractive power of the object side surface of the second lens becomes strong and negative refractive power of the overall second lens becomes weak. Thereby, correcting power for chromatic aberrations such as longitudinal chromatic aberration and chromatic aberration of magnification becomes weak. For strengthening negative refractive power of the overall second lens, it is necessary to strengthen negative refractive power of the image side surface of the second lens. However, it easily occurs high order aberrations such as coma flare. When the value of the conditional expression (2) is lower than the upper limit, dispersion of the second lens becomes great. Thereby, it is possible to effectively correct the chromatic aberrations such as longitudinal chromatic aberration and chromatic aberration of magnification, while, suppressing refractive power of the second lens. On the other hand, when the value of the conditional expression (2) exceeds the lower limit, materials which are easily available can be used for constitution of the lens.

It is preferable that the aforesaid image pickup lens satisfies the following conditional expressions.

$$-1.0 < (r1+r2)/(r1-r2) < -0.3 \quad (3)$$

$$2.0 < (r3+r4)/(r3-r4) < 5.0 \quad (4)$$

In the expressions, r1 is a paraxial curvature radius of an object side surface of the first lens, r2 is a paraxial curvature radius of an image side surface of the first lens, r3 is a paraxial curvature radius of the object side surface of the second lens, and r4 is a paraxial curvature radius of an image side surface of the second lens.

The conditional expression (3) stipulates a shaping factor of the first lens. When a value of the conditional expression (3) is lower than the upper limit value, a position of the principal point of the first lens moves toward the object side, and it is possible to suppress the total length of the image pickup lens. On the other hand, when the value of the conditional expression (3) exceeds the lower limit, occurrence of spherical aberration can be suppressed.

The conditional expression (4) stipulates a shaping factor of the second lens. When the value of the conditional expression (4) exceeds the lower limit, a position of the principal point of the second lens moves toward the image side. When combining it with the conditional expression (3), a distance between principal points of the first lens and the second lens is broadened, and it is possible to lower the refractive powers of the first lens and the second lens, while keeping a composite focal length of the first lens and the second lens. Thereby, occurrence of various aberrations can be suppressed. Further it makes an influence of manufacturing errors smaller, thus mass productivity is improved. On the other hand, when a value of the conditional expression (4) is lower than the upper limit, it is possible to suppress occurrence of a higher order aberration at such as coma flare caused by an increased curvature radius of the image side surface of the second lens.

It is preferable that the aforesaid image pickup lens satisfies the following conditional expression.

$$1.60 < n2 < 2.10 \quad (5)$$

In the expression, n2 is a refractive index of the second lens at d-line.

The conditional expression (5) represents a condition for correcting chromatic aberration and curvature of field of the total system of the image pickup lens satisfactorily. When a value of the conditional expression (5) exceeds the lower limit, it is possible to properly maintain the refractive power of the second lens with relatively larger dispersion. Thereby, the chromatic aberration and curvature of field can be corrected satisfactorily. On the other hand, when a value of the conditional expression (5) is lower than the upper limit, materials which are easily available can be used for constituting the lens.

As for the expression (5), a range of the following expression is more preferable.

$$1.60 < n2 < 2.00 \quad (5')$$

It is preferable that an object side surface of the fourth lens is formed in an aspheric shape, and the image pickup lens satisfies the following conditional expression.

$$0.05 < d6/f < 0.4 \quad (6)$$

In the expression, d6 is an air distance along an optical axis between the third lens and the fourth lens.

The conditional expression (6) prescribes a ratio of a surface distance on the optical axis between the third lens and the fourth lens to a focal length of the image pickup lens, When a value of the conditional expression (6) exceeds the lower limit, a distance between the third lens and the fourth lens is broadened, and a light flux passes through a different location for each image height on the object side surface of the fourth lens. Thereby, aberrations are effectively corrected by forming the object side surface of the fourth lens into an aspheric shape. On the other hand, when a value of the conditional expression (6) is lower than the upper limit, it is possible to suppress the total length of the image pickup lens.

Further, by separating the fourth lens from the third lens, it becomes easy to secure a space for inserting a light shielding member between the third lens and the fourth lens, for preventing unwanted light such as ghost, because a surface of the third lens facing the image side and a surface of the fourth lens facing the object side do not come too close. When trying the adjustment of a focal point through auto-focusing function and switching function to close-up photographing mode, the whole system of the lens group is moved in the direction of the optical axis, generally. In this case, space between the third lens and the fourth lens are properly secured, and it enables to adjusting the focal point by partially moving the lens group such that a part of the lens group, such as the first through third lenses, is moved in the direction of the optical axis. By employing this partial lens-movement, a part of the lens group, rather than the whole of the lens group, is needed to become a movable lens group. Therefore, a driving mechanism for the movable lens group can be simplified, and weight reduction of the overall image pickup apparatus can be achieved.

It is preferable that the fourth lens is a meniscus lens whose object side surface is a convex surface.

By forming the fourth lens into a meniscus lens whose object side surface is a convex surface, the principal point of the fourth lens with a negative refractive power moves toward the image side. It controls a increase of the back focus of the image pickup lens and the total length of the image pickup lens can be shortened.

It is preferable that an image side surface of the fourth lens is formed in an aspheric shape on which a center portion has a negative refractive power and the negative refractive power becomes smaller at a position being closer to a periphery, and the image side surface of the fourth lens includes an inflection point.

By forming the image side surface of the fourth lens into an aspheric shape on which the negative refractive power becomes smaller at a position being farther from the optical axis to the periphery and an inflection point is included, telecentricity of a light flux at the image side can be secured easily. Further, it does not require the image side surface of the second lens to have negative refractive power that is excessively weak on the lens periphery portion, which makes it possible to correct off-axis aberration properly. In this case, "the inflection point" means a point on an aspheric surface such that a tangential plane on a peak of the aspheric surface becomes perpendicular to the optical axis, on a curved line of the cross-sectional shape of the lens within its effective radius.

It is preferable that at least one of the first lens and the second lens comprises a glass material.

In the image pickup lens in which the first and the second lenses having relatively strong refractive power are formed of glass material, fluctuation of an image point position in the case of temperature changes in the total image pickup lens system can be decreased. At the same time, by employing plastic lenses for the third lens and the fourth lens, it is possible to control cost to be low for the total image pickup lens. Further, when the first lens is formed of a glass material, the image pickup lens can be constructed without a plastic lens exposed in the outside, which makes it possible to avoid a problem of the first lens from being damaged.

It is preferable that each of the first, second, third, and fourth lenses comprises a plastic material.

In recent years, under the purpose of downsizing of an overall solid-state image pickup apparatus, there has been developed a solid-state image pickup element with a smaller pixel pitch, resulting in a smaller size of an image pickup surface, compared with a solid-state image pickup element having the same number of pixels. In the image pickup lens for the solid-state image pickup element having a small size of the image pickup surface of this kind, a focal length of the total optical system is requested to be relatively short, which makes a curvature radius and outside diameter of each lens to be considerably small. Therefore, when compared with a glass lens manufactured through time-consuming grinding processing, image pickup lenses in which all lenses are plastic lenses manufactured by injection molding can be mass-produced at low cost even if each lens has a small curvature radius and a small outside diameter. In addition, it is possible to control wear and tear of a molding die because press temperature can be made low in the case of a plastic lens, resulting in reduction of the number of times for replacement of molding dies and of the number of times for maintenance, which realizes cost reduction.

Another embodiment of the present invention is an image pickup apparatus comprising: a solid-state image pickup element for photo-electrically converting an image of a subject, and the above image pickup lens. By employing the image pickup lens in the present embodiment, an image pickup apparatus that is smaller in size and has higher property can be obtained.

Another embodiment of the present invention is a mobile terminal comprising the above image pickup apparatus. By employing the image pickup apparatus in the present embodiment, the mobile terminal that is smaller in size and has higher property can be obtained.

The aforesaid embodiments makes it possible to provide an image pickup lens in a four-element structure in which various aberrations are properly corrected in spite of its smaller size than a conventional type, and to provide an image pickup apparatus and a mobile terminal which are equipped with the aforesaid image pickup lens.

Hereafter, although embodiments explain the present invention in detail, the present invention is not limited to this.

Figure 2:
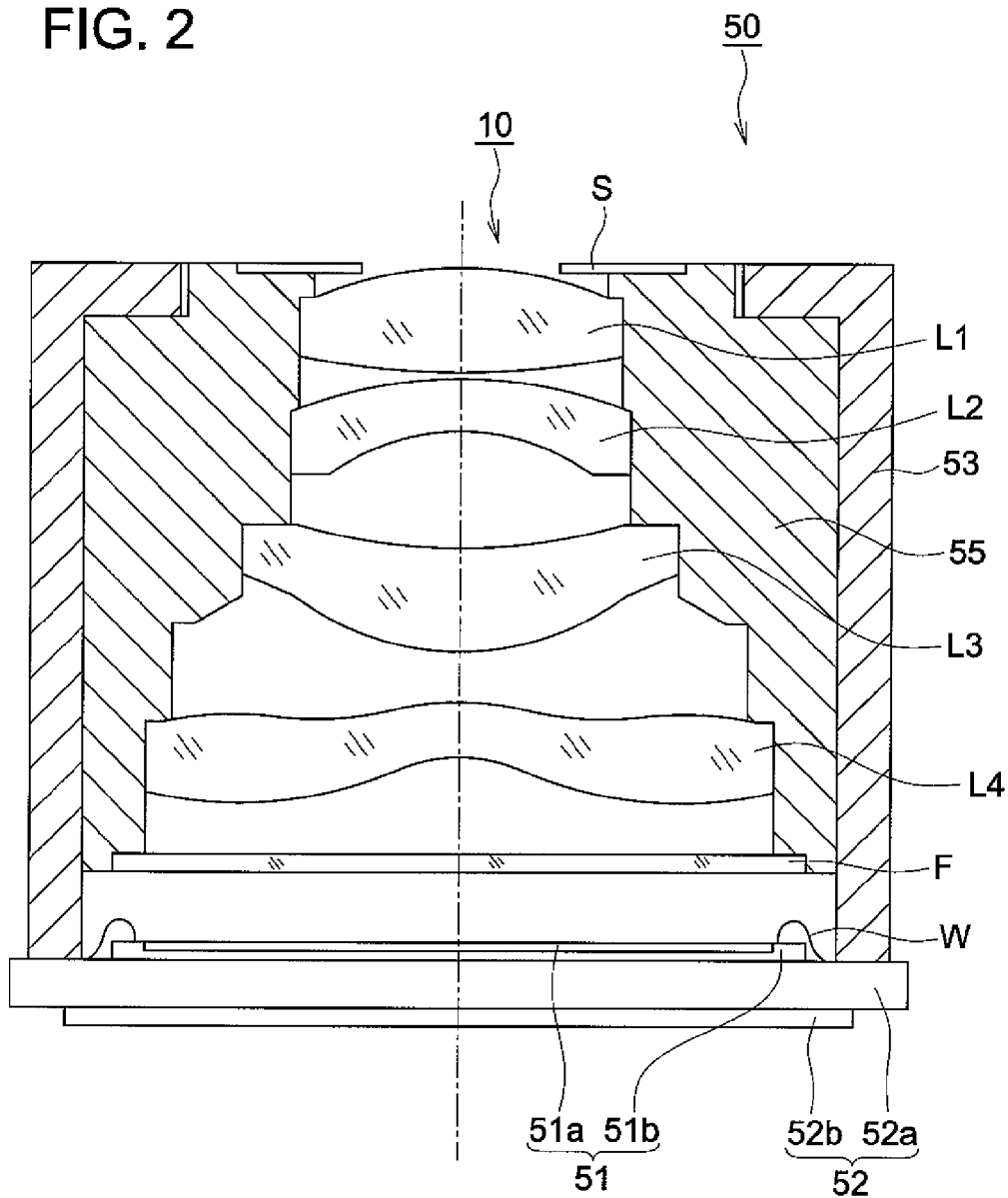
FIG. 2 shows a diagram schematically showing a cross-section of the image pickup apparatus relating to the present embodiment, taken on a line along the optical axis of an image pickup lens of the image pickup apparatus.

FIG. 1 is a perspective view of image pickup apparatus 50 relating to the embodiment of the invention. FIG. 2 is a diagram schematically showing a cross-section of the image pickup apparatus 50 relating to the present embodiment, taken on a line along an optical axis of an image pickup lens in the image pickup apparatus 50.

As shown in FIG. 1, the image pickup apparatus 50 is equipped with image pickup lens 10, casing 53, supporting substrate 52a and flexible printed circuit board 52b, which are integrated in one body. The image pickup lens 10 is provided to form an image of a photographic object on a photoelectric converter of an image pickup element. The casing 53 is served as a lens tube composed of a light shielding member. The supporting substrate 52a supports image pickup element 51. The flexible printed circuit board 52b includes terminal 54 for external connection (which is also called external connection terminal) that sends and receives of electric signal.

As shown in FIG. 2, at the central portion of the light-receiving side surface of image pickup element 51 of a CMOS type, there is formed photoelectric converter 51a serving as a light-receiving section on which pixels (photoelectric converting elements) are arranged on a two-dimensional manner. On its circumference, there is formed signal processing circuit 51b. The signal processing circuit 51b is composed of a drive circuit section that drives respective pixels in order to obtain signal electric charges, an A/D converting section that converts each signal electric charge into a digital signal and of a signal processing section that generates image signal output from the digital signal.

There are provided many unillustrated pads which are connected to supporting substrate 52a through bonding wires W, around an outer edge of the light-receiving side surface of image pickup element 51. The image pickup element 51 converts signal electric charges coming from photoelectric converter 51a into image signal such as digital YUV signal to output it to prescribed circuits on the supporting substrate 52a through bonding wires. Y represents luminance signal, U (=R−Y) represents color difference signal of red signal and luminance signal, and V (=B−Y) represents color difference signal of blue signal and luminance signal.

Meanwhile, the image pickup element is not limited only to an image sensor of the aforesaid CMOS type, and another one such as CCD or the like can be applied.

Substrate 52 is composed of hard supporting substrate 52a that supports, with its surface on one side, image pickup element device 51 and casing 53, and of flexible printed circuit board 52b whose one end portion is connected to the other side of supporting substrate 52a. On both sides including the surface and the reverse side of the supporting substrate 52a, there are provided many pads for signal transmission, and they are connected with image pickup element 51 through bonding wires on one side, and they are connected with flexible printed circuit board 52b on the other side.

As shown in FIG. 1, one end portion of the flexible printed circuit board 52b is connected to supporting substrate 52a, and the flexible printed circuit board 52b connects the supporting substrate 52a with an unillustrated external circuit (for example, a control circuit provided on an upper device on which an image pickup apparatus is mounted) through external connection terminal 54 provided on the other end portion of the flexible printed circuit board 52b. By this connection, the image pickup apparatus can receive the voltage and clock signal for driving image pickup element 51 to be supplied from the external circuit, and can output digital YUV signal to the external circuits. Further, the flexible printed circuit board 52b has flexibility and changes its shape at its middle portion to give the degree of freedom to the supporting substrate 52a for the direction and arrangement of the external connection terminal 54.

As shown in FIG. 2, casing 53 is arranged to be fixed on the surface of supporting substrate 52a on the image pickup element 51 side so that it may cover image pickup element 51. Namely, the casing 53 is formed into a cylinder shape having a wide opening on one end portion facing to the image pickup element 51 and having a flange and a small aperture on the other end portion, to be fixed and contacted with supporting substrate 52a so as to cover the image pickup element 51.

Inside the casing 53, there is fixed and arranged infrared cut filter F between image pickup lens 10 and image pickup element 51.

Image pickup lens 10 includes therein aperture stop S representing a member determining F number of the total system of image pickup lens, positive first lens L1 whose convex surface faces the object side, negative second lens L2 whose concave surface faces the image side, positive third lens L3 in a meniscus shape whose convex surface faces the image side and negative fourth lens L4 in a meniscus shape whose convex surface faces the object side. The image pickup lens 10 has a function to form an image of a photographic object on an image pickup element. The first lens L1 is a biconvex lens wherein a curvature radius of the image side surface is smaller than a curvature radius of the object side surface. The second lens L2 is a meniscus lens whose object side surface is a convex surface. It is preferable that the image side surface of the second lens L2 is formed into an aspheric shape, in which its center has negative refractive power and the negative refractive power becomes weaker toward the periphery. Further, it is preferable that the image side surface of fourth lens L4 is formed into an aspheric shape, in which its center has negative refractive power, the negative refractive power becomes weaker toward the periphery and it has an inflection point. Incidentally, in FIGS. 1 and 2, an upper side represents the object side, and a lower side represents the image side.

Respective lenses L1 through L4 constituting the image pickup lens 10 are held by lens frame 55. Casing 53 houses the lens frame 55 and image pickup lens 10 that is held by the lens frame 55. The lens frame 55 is engaged with casing 53 through its outer circumference, and it is hit by a flange section of the casing 53 having a smaller aperture to be positioned.

It is possible to further arrange fixed diaphragms for cutting unwanted light between respective lenses L1 through L4, though this is not illustrated. In particular, it is preferable to arrange the fixed diaphragm between the third lens L3 and the fourth lens L4 and between the fourth lens L4 and infrared cut filter F. It is possible to suppress occurrence of ghost and flare, by arranging a rectangular fixed diaphragm on the outer side of an optical path. It is further possible to arrange spacers for fixing distances between respective lenses L1 through L4 or between the fourth lens and infrared cut filter F, and to form a fixed diaphragm on the spacer for cutting unwanted light.

Figure 3:
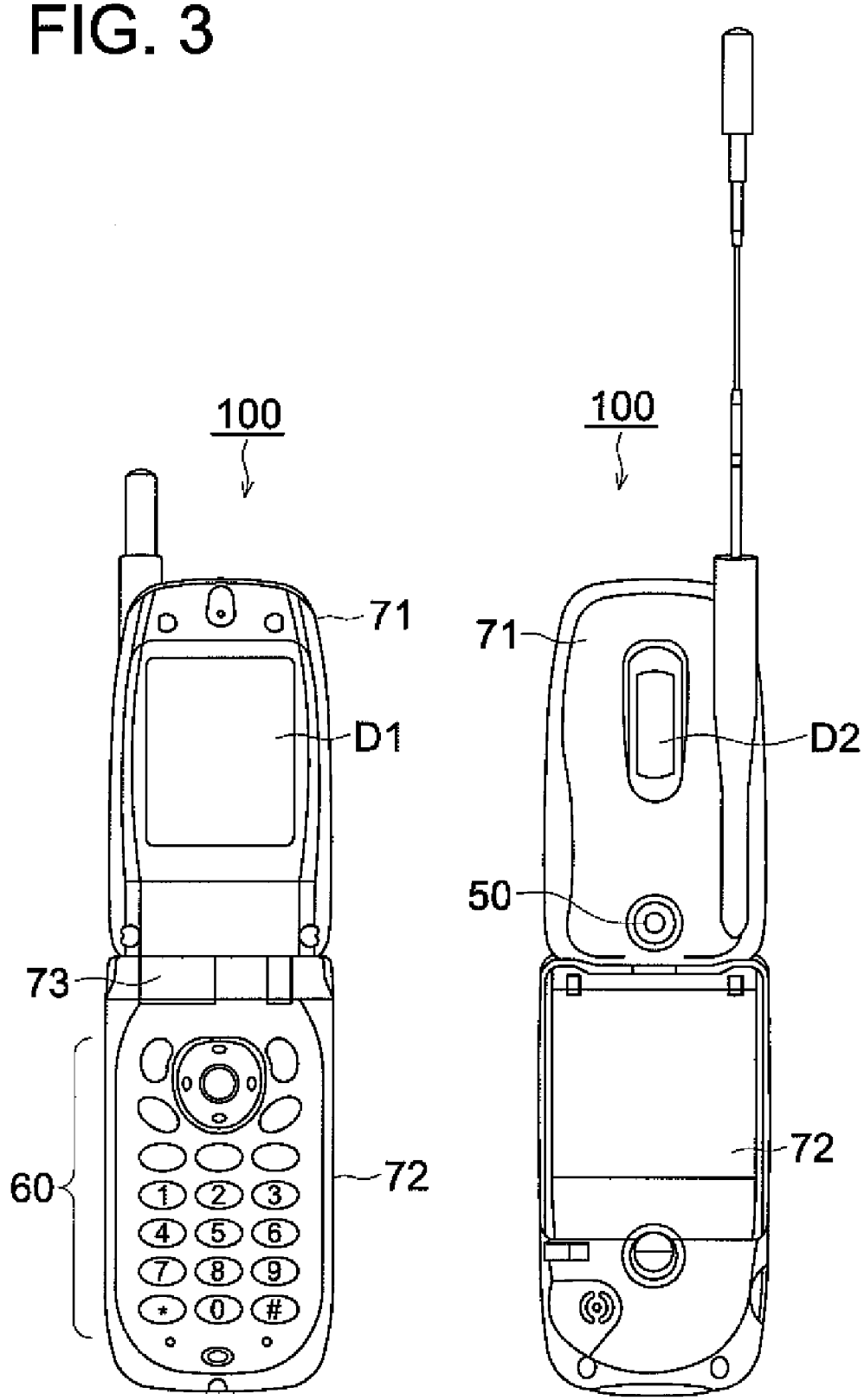
FIG. 3 shows outline views of a cell-phone which is an example of a mobile terminal employing the image pickup apparatus relating to the present embodiment.

FIG. 3 shows outline views of cell phone 100 that is an example of a mobile terminal equipped with image pickup apparatus 50 relating to the present embodiment.

In cell phone 100 shown in FIG. 3, upper casing 71 representing a case and lower case 72 are connected with each other through hinge 73. The upper casing 71 is equipped with display screens D1 and D2, and the lower case 72 is equipped with operation button 60 representing an input section. Image pickup apparatus 50 is housed in the lower portion under the display screen D2 in the upper casing 71 to be arranged in a way that the image pickup apparatus 50 may take light from the outer surface side of the upper casing 71.

Meanwhile, a position of the image pickup apparatus may be either on the upper portion or on the side of the display screen D2 in the upper casing 71. Further, a type of the cell phone in this case is not limited only to the folding type naturally.

Figure 4:
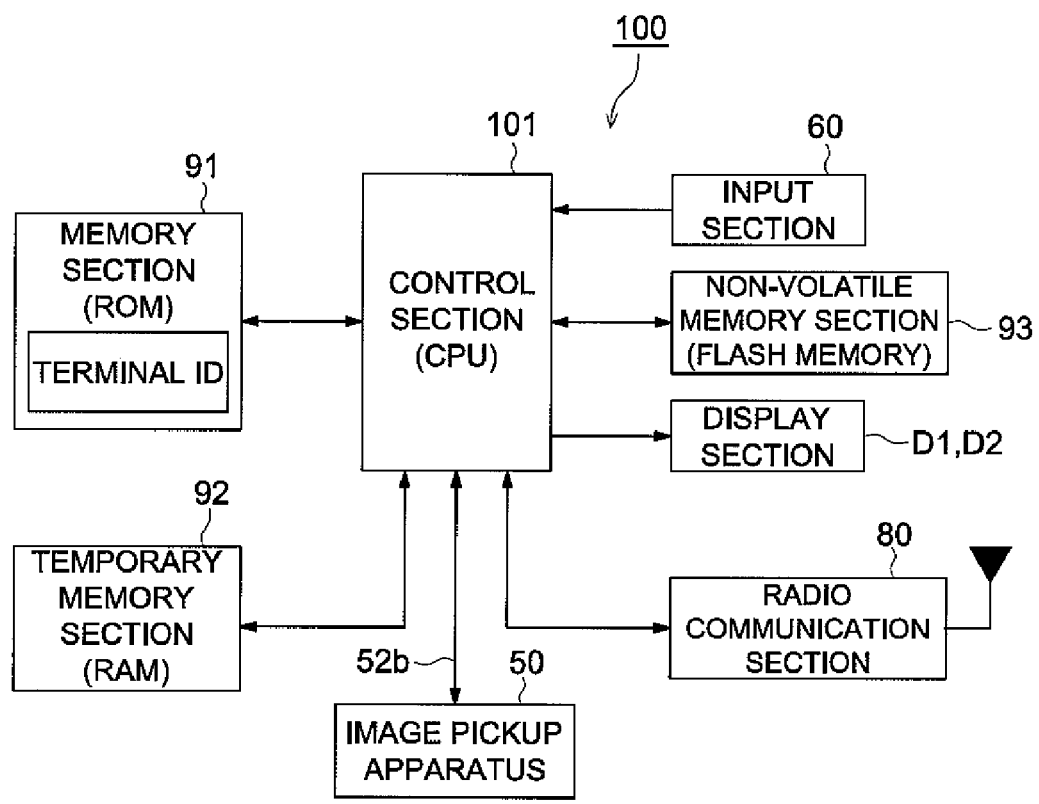
FIG. 4 shows an example of a control block diagram of the cell-phone.

FIG. 4 is a diagram showing an example of a control block of the cell phone 100.

As shown in FIG. 4, image pickup apparatus 50 is connected to control section 101 of the cell phone 100 through flexible printed circuit board 52b, and outputs image signal such as luminance signal and color difference signal to the control section 101.

On the other hand, the cell phone 100 is equipped with control section (CPU) 101, operation button 60 representing an input section, display screens D1 and D2 representing a display section, radio communication section 80, memory section (ROM) 91, and temporary memory section (RAM) 92. The control section (CPU) 101 controls parts of the cell phone on a supervision basis and carries out programs according to various processing. The operation button 60 is an input section for instructing and inputting the numbers. The display screens D1 and D2 display the prescribed data and images taken by the image pickup lens. The radio communication section 80 is provided for realizing various types of information communications with outer servers. The memory section (ROM) 91 stores necessary various data such as system programs of cell phone 100, various types of processing programs and terminal ID. The temporary memory section (RAM) 92 is used as a working area or stores temporarily various processing programs and data to be carried out by control section 101, processing data, and image data from image pickup apparatus 50.

Further, image signal inputted from image pickup apparatus 50 is stored in non-volatile memory section (flash memory) 93 by control section 101 of cell phone 100, is displayed on display screens D1 and D2, or is transmitted to the outside through radio communication section 80. Incidentally, the cell phone 100 has thereon a microphone and a speaker for inputting and outputting voices, which is not illustrated.

EXAMPLES

Examples of image pickup lenses applied to the aforesaid embodiments will be shown below. The following symbols are used in the respective examples.

f: Focal length of the total system of the image pickup lens
fB: Back focus
F: F-number
2Y: Diagonal length of image pickup surface of the solid-state image pickup element (Diagonal length on rectangular effective pixel area of the solid-state image pickup element)
ENTP: Entrance pupil position (Distance from the first surface to entrance pupil position)
EXTP: Emergence pupil position (Distance from image plane to the emergence pupil position)
H1: Front side principal point position (Distance from the first surface to front side principal point)
H2: Rear side principal point position (Distance from the last surface to rear side principal point)
r: Curvature radius of refractive surface
d: Surface distance of the optical axis
Nd: Refractive index of lens material at normal temperature for d-line
vd: Abbe number of lens material In each Example, the asterisk (*) following each surface number means an aspheric surface and the shape of the aspheric surface is expressed by the following expression (8), where X-axis extends along the optical axis direction, the top of the surface is on the origin, and the height perpendicular to the optical axis is h.

$$X = \frac{h^2/r}{1+\sqrt{1-(1+K)h^2/r^2}} + \sum A_i h^i \quad (8)$$

In the aforesaid expression, $A_i$ represents $i^{th}$ order aspheric surface coefficient, r represents a curvature radius and K represents a conic constant.

In the following description (including lens data in Tables), an exponent for 10 is assumed to be expressed by using E (for example, 2.5×10-02 is expressed by 2.5E-02). Further, surface numbers in lens data are numbered by assuming the surface of the first lens facing the object as the first surface. Incidentally, each of all units of numerical values indicating lengths described in the Examples is mm.

Example 1

Lens data of an image pickup lens in Example 1 is shown in the following Table 1.

TABLE 1 f = 4.58 mm fB = 0.63 mm F = 2.88 2Y = 5.744 mm ENTP = 0 mm
EXTP = −3.37 mm H1 = −0.65 mm H2 = −3.93 mm

| Surface No. | r (mm) | d (mm) | Nd | νd | Effective radius (mm) |
|---|---|---|---|---|---|
| 1 (diaphragm) | ∞ | 0.000 | | | 0.80 |
| 2* | 2.543 | 0.875 | 1.54470 | 56.2 | 0.88 |
| 3* | −5.491 | 0.050 | | | 1.02 |
| 4* | 4.160 | 0.424 | 1.63200 | 23.4 | 1.07 |
| 5* | 1.700 | 0.941 | | | 1.08 |
| 6* | −4.823 | 0.877 | 1.54470 | 56.2 | 1.42 |
| 7* | −1.752 | 0.410 | | | 1.66 |
| 8* | 1.760 | 0.450 | 1.54470 | 56.2 | 2.33 |
| 9* | 1.017 | 0.800 | | | 2.50 |
| 10 | ∞ | 0.145 | 1.51630 | 64.1 | 2.66 |
| 11 | ∞ | | | | 2.68 |

| Aspheric surface coefficient | |
|---|---|
| 2$^{nd}$ surface | K = −0.87815E+00 |
| | A4 = −0.26635E−02 |
| | A6 = −0.13015E−01 |
| | A8 = 0.10158E−01 |
| | A10 = −0.70104E−02 |
| 3$^{rd}$ surface | K = 0.29799E+01 |
| | A4 = 0.12014E−01 |
| | A6 = 0.20195E−01 |
| | A8 = −0.30342E−01 |
| | A10 = 0.89631E−02 |
| 4$^{th}$ surface | K = −0.69336E+01 |
| | A4 = −0.17267E−01 |
| | A6 = 0.45308E−01 |
| | A8 = −0.18898E−01 |
| | A10 = 0.19901E−02 |
| 5$^{th}$ surface | K = −0.47047E+01 |
| | A4 = 0.53012E−01 |
| | A6 = −0.13803E−01 |
| | A8 = 0.27111E−01 |
| | A10 = −0.10791E−01 |
| 6$^{th}$ surface | K = 0.82351E+01 |
| | A4 = 0.26980E−01 |
| | A6 = −0.23281E−01 |
| | A8 = 0.15030E−01 |
| | A10 = −0.15297E−02 |
| 7$^{th}$ surface | K = −0.90946E+00 |
| | A4 = 0.13042E−01 |
| | A6 = 0.13022E−01 |

TABLE 1-continued

| | |
|---|---|
| | A8 = −0.15132E−02 |
| | A10 = 0.82497E−02 |
| | A12 = −0.13463E−02 |
| 8$^{th}$ surface | K = −0.97467E+01 |
| | A4 = −0.93478E−01 |
| | A6 = 0.30813E−01 |
| | A8 = −0.48863E−02 |
| | A10 = 0.43362E−03 |
| | A12 = −0.17751E−04 |
| 9$^{th}$ surface | K = −0.42440E+01 |
| | A4 = −0.69865E−01 |
| | A6 = 0.19966E−01 |
| | A8 = −0.37596E−02 |
| | A10 = 0.40155E−03 |
| | A12 = −0.17738E−04 |

| Data of each single lens | | |
|---|---|---|
| Lens | Starting surface | Focal length (mm) |
| 1 | 2 | 3.318 |
| 2 | 4 | −4.873 |
| 3 | 6 | 4.588 |
| 4 | 8 | −5.619 |

Values corresponding to conditional expressions (1), (2), (3), (4), (5), (6) and (7) for the image pickup lens in Example 1 are shown as follows.

$$r3/f=0.908 \quad (1)$$

$$\nu2=23.4 \quad (2)$$

$$(r1+r2)/(r1-r2)=-0.367 \quad (3)$$

$$(r3+r4)/(r3-r4)=2.382 \quad (4)$$

$$n2=1.632 \quad (5)$$

$$d6/f=0.090 \quad (6)$$

$$L/2Y=0.98 \quad (4)$$

In Example 1, all lenses are made of plastic materials.

Figure 5:
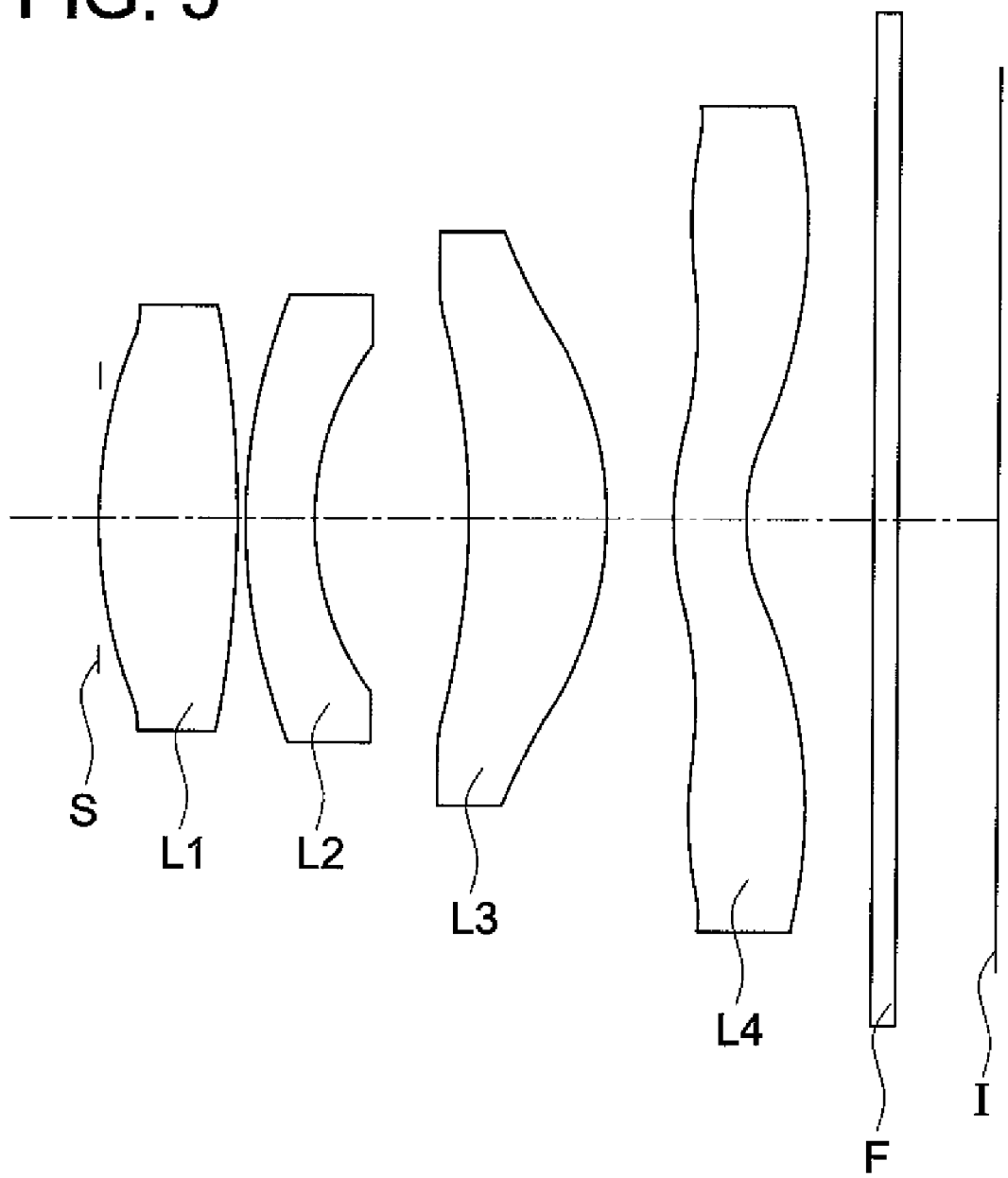
FIG. 5 shows a sectional view of the image pickup lens in Example 1.

FIG. 5 is a cross-sectional view of the image pickup lens in Example 1. There are shown aperture stop S, first lens L1, second lens L2, third lens L3, fourth lens L4 and parallel flat plate F that is assumed to be an optical lowpass filter, an infrared cut filter or a seal glass of a solid-state image pickup element, in this order from the object side along the optical axis, and I shows a position of an image pickup surface of the solid-state image pickup element.

FIG. 6 shows diagrams of aberrations (spherical aberration, astigmatism, distortion and meridional coma, respectively) of the image pickup lens shown in Example 1. In the following diagrams of aberrations, solid lines correspond to d-line and dotted lines correspond to g-line in the diagram of spherical aberration, while, solid lines correspond to a suggital image surface and dotted lines correspond to a meridional image surface in the diagram of astigmatism.

Example 2

Lens data of an image pickup lens in Example 2 is shown in the following Table 2.

TABLE 2 f = 4.18 mm  fB = 0.37 mm  F = 2.88  2Y = 5.67 mm  ENTP = 0 mm
EXTP = −2.55 mm  H1 = −1.78 mm  H2 = −3.79 mm

| Surface No. | r (mm) | d (mm) | Nd | νd | Effective radius (mm) |
|---|---|---|---|---|---|
| 1 (diaphragm) | ∞ | 0.000 | | | 0.73 |
| 2* | 1.849 | 0.639 | 1.53050 | 55.7 | 0.86 |
| 3* | −18.381 | 0.050 | | | 0.91 |
| 4* | 3.416 | 0.350 | 1.63200 | 23.4 | 0.96 |
| 5* | 1.564 | 0.707 | | | 0.99 |
| 6* | −12.758 | 0.751 | 1.53050 | 55.7 | 1.35 |
| 7* | −2.321 | 0.833 | | | 1.57 |
| 8* | 1.853 | 0.452 | 1.53050 | 55.7 | 2.38 |
| 9* | 0.991 | 0.550 | | | 2.60 |
| 10 | ∞ | 0.145 | 1.51630 | 64.1 | 2.84 |
| 11 | ∞ | | | | 2.87 |

| Aspheric surface coefficient | |
|---|---|
| 2$^{nd}$ surface | K = 0.19873E+00 |
| | A4 = 0.66784E−02 |
| | A6 = −0.16225E−01 |
| | A8 = 0.39188E−01 |
| | A10 = −0.15189E−01 |
| 3$^{rd}$ surface | K = −0.24181E+02 |
| | A4 = 0.46255E−01 |
| | A6 = 0.59241E−01 |
| | A8 = −0.53468E−01 |
| | A10 = 0.48304E−01 |
| | A12 = −0.84442E−02 |
| 4$^{th}$ surface | K = −0.41128E+01 |
| | A4 = −0.16434E−01 |
| | A6 = 0.32980E−01 |
| | A8 = 0.30057E−01 |
| | A10 = −0.24900E−01 |
| 5$^{th}$ surface | K = −0.20503E+01 |
| | A4 = −0.77263E−02 |
| | A6 = 0.28734E−01 |
| | A8 = −0.20320E−02 |
| | A10 = 0.29232E−01 |
| | A12 = −0.21066E−01 |
| 6$^{th}$ surface | K = −0.13339E+01 |
| | A4 = −0.82853E−02 |
| | A6 = 0.33482E−01 |
| | A8 = −0.25473E−01 |
| | A10 = 0.10634E−01 |
| | A12 = −0.19061E−02 |
| 7$^{th}$ surface | K = −0.48695E+00 |
| | A4 = −0.11932E−01 |
| | A6 = 0.26570E−01 |
| | A8 = −0.23621E−02 |
| | A10 = 0.11497E−02 |
| | A12 = −0.49087E−03 |
| 8$^{th}$ surface | K = −0.20718E+02 |
| | A4 = −0.14702E+00 |
| | A6 = 0.46636E−01 |
| | A8 = −0.62045E−02 |
| | A10 = 0.38357E−03 |
| | A12 = −0.88371E−05 |
| 9$^{th}$ surface | K = −0.65036E+01 |
| | A4 = −0.66202E−01 |
| | A6 = 0.14680E−01 |
| | A8 = −0.26667E−02 |

TABLE 2-continued

| | A10 = 0.30972E−03 |
| | A12 = −0.14709E−04 |

| Data of each single lens | | |
|---|---|---|
| Lens | Starting surface | Focal length (mm) |
| 1 | 2 | 3.203 |
| 2 | 4 | −4.923 |
| 3 | 6 | 5.220 |
| 4 | 8 | −4.908 |

Values corresponding to conditional expressions (1), (2), (3), (4), (5), (6) and (7) for the image pickup lens in Example 2 are shown as follows.

$$r3/f = 0.818 \quad (1)$$

$$\nu 2 = 23.4 \quad (2)$$

$$(r1+r2)/(r1-r2) = -0.817 \quad (3)$$

$$(r3+r4)/(r3-r4) = 2.688 \quad (4)$$

$$n2 = 1.632 \quad (5)$$

$$d6/f = 0.199 \quad (6)$$

$$L/2Y = 0.85 \quad (7)$$

In the Example 2, all lenses are made of plastic materials.

Figure 7:
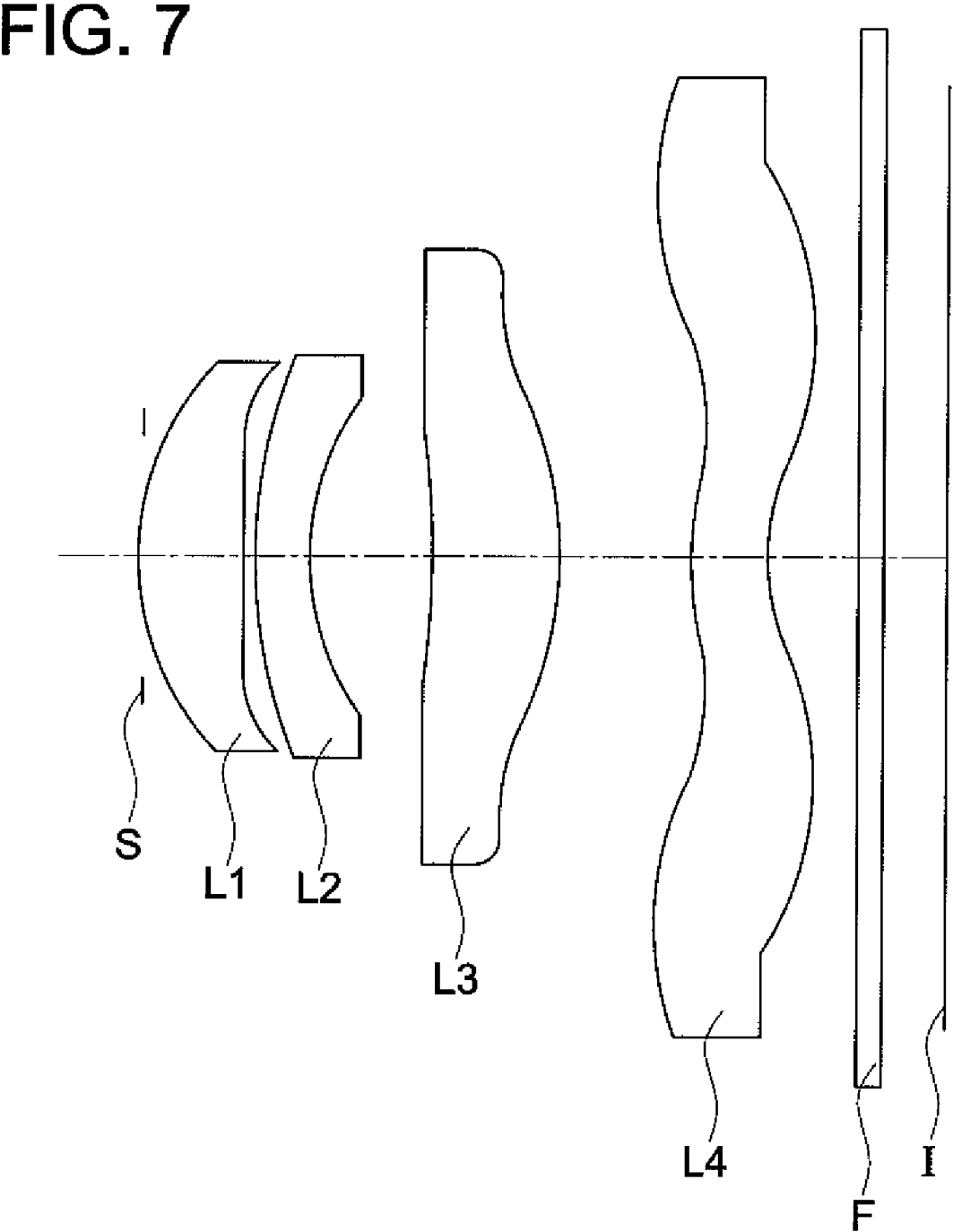
FIG. 7 shows a sectional view of the image pickup lens in Example 2.

FIG. 7 is a cross-sectional view of the image pickup lens in Example 2. There are shown aperture stop S, first lens L1, second lens L2, third lens L3, fourth lens L4 and parallel flat plate F that is assumed to be an optical lowpass filter, an infrared cut filter or a seal glass of a solid-state image pickup element, in this order from the object side along the optical axis, and I shows a position of an image pickup surface of the solid-state image pickup element.

FIG. 8 shows diagrams of aberrations (spherical aberration, astigmatism, distortion and meridional coma, respectively) of the image pickup lens shown in Example 2.

Example 3

Lens data of an image pickup lens in Example 3 is shown in the following Table 3.

TABLE 3 f = 4.32 mm  fB = 0.38 mm  F = 2.88  2Y = 5.67 mm  ENTP = 0 mm
EXTP = −2.66 mm  H1 = −1.82 mm  H2 = −3.94 mm

| Surface No. | r (mm) | d (mm) | Nd | νd | Effective radius (mm) |
|---|---|---|---|---|---|
| 1 (diaphragm) | ∞ | 0.000 | | | 0.75 |
| 2* | 2.478 | 0.620 | 1.53050 | 55.7 | 0.89 |
| 3* | −5.648 | 0.050 | | | 0.99 |
| 4* | 2.196 | 0.350 | 1.63200 | 23.4 | 1.09 |
| 5* | 1.285 | 0.500 | | | 1.07 |
| 6* | −3.847 | 0.530 | 1.53050 | 55.7 | 1.14 |
| 7* | −2.023 | 1.290 | | | 1.28 |
| 8* | 2.379 | 0.450 | 1.53050 | 55.7 | 2.32 |
| 9* | 1.298 | 0.550 | | | 2.52 |

TABLE 3-continued

| | | | | | |
|---|---|---|---|---|---|
| 10 | ∞ | 0.145 | 1.51630 | 64.1 | 2.83 |
| 11 | ∞ | | | | 2.86 |

| Aspheric surface coefficient | |
|---|---|
| $2^{nd}$ surface | K = −0.51935E+00 |
| | A4 = −0.99544E−02 |
| | A6 = −0.37008E−01 |
| | A8 = 0.31891E−01 |
| | A10 = −0.24137E−01 |
| $3^{rd}$ surface | K = −0.14982E+02 |
| | A4 = −0.25055E−01 |
| | A6 = 0.21801E−01 |
| | A8 = −0.17328E−01 |
| | A10 = −0.53566E−02 |
| $4^{th}$ surface | K = −0.74388E+01 |
| | A4 = −0.71149E−02 |
| | A6 = 0.25437E−01 |
| | A8 = 0.80818E−02 |
| | A10 = −0.68705E−02 |
| $5^{th}$ surface | K = −0.25131E+01 |
| | A4 = 0.56076E−02 |
| | A6 = 0.24350E−01 |
| | A8 = 0.13995E−01 |
| | A10 = −0.83925E−02 |
| $6^{th}$ surface | K = −0.38321E+00 |
| | A4 = 0.37199E−01 |
| | A6 = 0.45017E−01 |
| | A8 = 0.31276E−01 |
| | A10 = −0.24327E−01 |
| $7^{th}$ surface | K = −0.19795E+01 |
| | A4 = 0.11358E−01 |
| | A6 = 0.24458E−01 |
| | A8 = 0.27319E−01 |
| | A10 = 0.57707E−02 |
| | A12 = −0.89055E−02 |
| $8^{th}$ surface | K = −0.22186E+02 |
| | A4 = −0.10786E+00 |
| | A6 = 0.33752E−01 |
| | A8 = −0.59066E−02 |
| | A10 = 0.67013E−03 |
| | A12 = −0.35435E−04 |
| $9^{th}$ surface | K = −0.66502E+01 |
| | A4 = −0.67881E−01 |
| | A6 = 0.16049E−01 |
| | A8 = −0.30509E−02 |
| | A10 = 0.31138E−03 |
| | A12 = −0.11992E−04 |

| Data of each single lens | | |
|---|---|---|
| Lens | Starting surface | Focal length (mm) |
| 1 | 2 | 3.335 |
| 2 | 4 | −5.760 |
| 3 | 6 | 7.304 |
| 4 | 8 | −6.297 |

Values corresponding to conditional expressions (1), (2), (3), (4), (5), (6) and (7) for the image pickup lens in Example 3 are shown as follows.

$$r3/f = 0.508 \quad (1)$$

$$v2 = 23.4 \quad (2)$$

$$(r1+r2)/(r1-r2) = -0.390 \quad (3)$$

$$(r3+r4)/(r3-r4) = 3.822 \quad (4)$$

$$n2 = 1.632 \quad (5)$$

$$d6/f = 0.299 \quad (6)$$

$$L/2Y = 0.85 \quad (7)$$

In the Example 3, all lenses are made of plastic materials.

Figure 9:
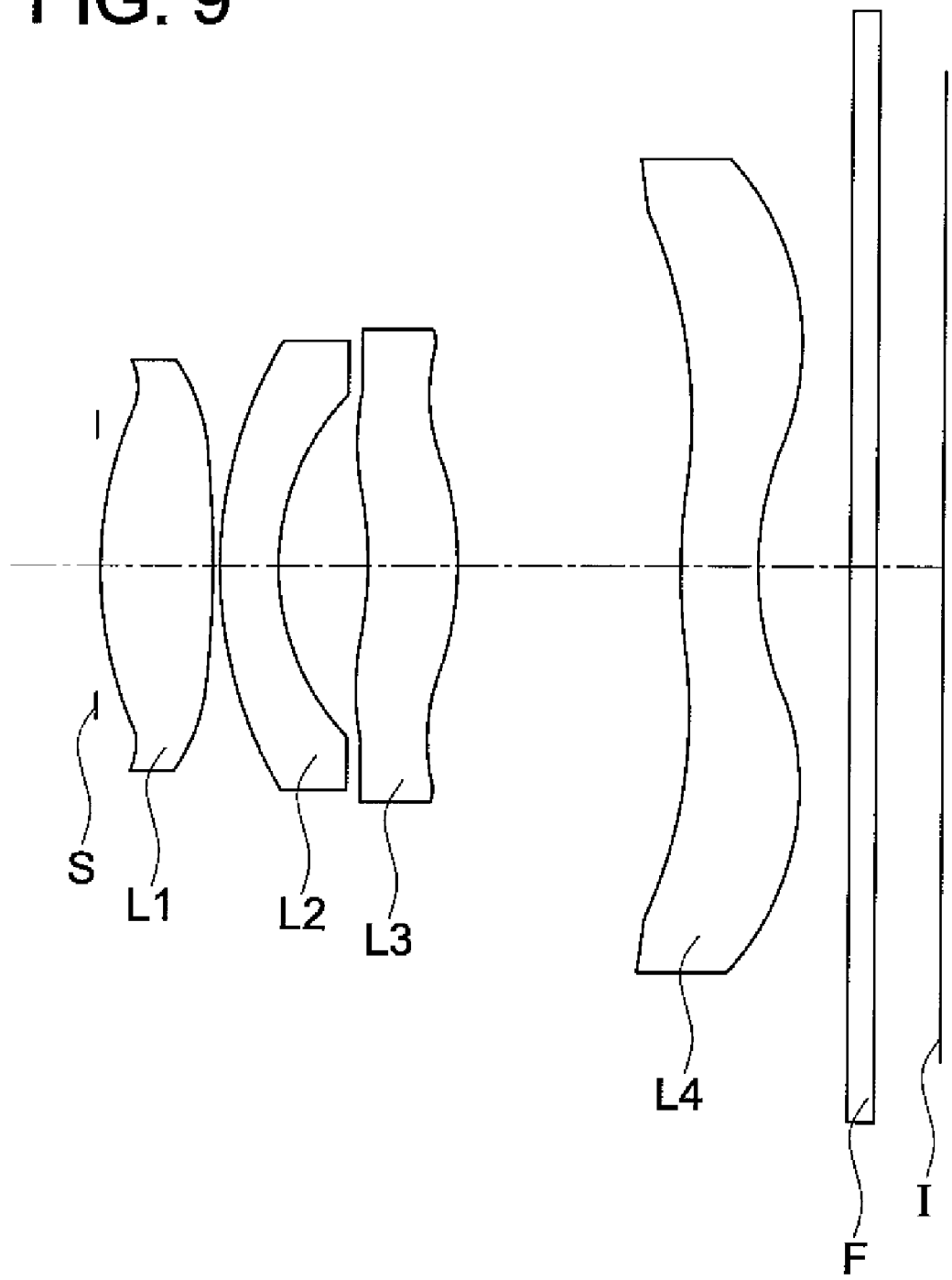
FIG. 9 shows a sectional view of the image pickup lens in Example 3.

FIG. 9 is a cross-sectional view of the image pickup lens in Example 3. There are shown aperture stop S, first lens L1, second lens L2, third lens L3, fourth lens L4 and parallel flat plate F that is assumed to be an optical lowpass filter, an infrared cut filter or a seal glass of a solid-state image pickup element, in this order from the object side along the optical axis, and I shows a position of an image pickup surface of the solid-state image pickup element.

FIG. 10 shows diagrams of aberrations (spherical aberration, astigmatism, distortion and meridional coma, respectively) of the image pickup lens shown in Example 3.

Example 4

Lens data of an image pickup lens in Example 4 is shown in the following Table 4.

TABLE 4

| f = 4.15 mm fB = 0.33 mm F = 2.88 2Y = 5.67 mm ENTP = 0 mm |
| EXTP = −2.48 mm H1 = −1.98 mm H2 = −3.82 mm |

| Surface No. | r (mm) | d (mm) | Nd | vd | Effective radius (mm) |
|---|---|---|---|---|---|
| 1 (diaphragm) | ∞ | 0.000 | | | 0.77 |
| 2* | 1.937 | 0.771 | 1.58910 | 61.2 | 0.88 |
| 3* | 38.199 | 0.050 | | | 0.94 |
| 4* | 3.749 | 0.350 | 1.63200 | 23.4 | 0.98 |
| 5* | 1.843 | 0.634 | | | 1.00 |
| 6* | −8.362 | 0.736 | 1.53050 | 55.7 | 1.21 |
| 7* | −2.261 | 0.819 | | | 1.45 |
| 8* | 1.831 | 0.462 | 1.53050 | 55.7 | 2.11 |
| 9* | 0.965 | 0.550 | | | 2.40 |
| 10 | ∞ | 0.145 | 1.51630 | 64.1 | 2.67 |
| 11 | ∞ | | | | 2.70 |

| Aspheric surface coefficient | |
|---|---|
| $2^{nd}$ surface | K = −0.38718E−01 |
| | A4 = 0.14489E−02 |
| | A6 = 0.29053E−03 |
| | A8 = 0.11852E−02 |
| $3^{rd}$ surface | K = −0.30000E+2 |
| | A4 = −0.46153E−02 |
| | A6 = 0.64417E−01 |
| | A8 = −0.29302E−01 |
| $4^{th}$ surface | K = −0.94872E+01 |
| | A4 = −0.17413E−01 |
| | A6 = 0.44440E−01 |
| | A8 = 0.25044E−01 |
| | A10 = −0.30185E−01 |
| $5^{th}$ surface | K = −0.13412E+01 |
| | A4 = −0.26524E−03 |
| | A6 = 0.20090E−01 |
| | A8 = −0.67957E−02 |
| | A10 = 0.39536E−01 |
| | A12 = −0.25034E−01 |
| $6^{th}$ surface | K = 0.18500E+02 |
| | A4 = −0.79070E−02 |
| | A6 = 0.22700E−01 |
| | A8 = −0.13006E−01 |
| | A10 = 0.30632E−02 |
| | A12 = 0.50448E−04 |
| $7^{th}$ surface | K = 0.16179E+00 |
| | A4 = −0.11007E−01 |
| | A6 = 0.28214E−01 |
| | A8 = −0.54550E−02 |
| | A10 = 0.41053E−02 |
| | A12 = −0.11456E−02 |
| $8^{th}$ surface | K = −0.30000E+2 |
| | A4 = −0.14995E+00 |

TABLE 4-continued

|  |  |
|---|---|
| | A6 = 0.47390E−01 |
| | A8 = −0.62134E−02 |
| | A10 = 0.38209E−03 |
| | A12 = −0.10089E−04 |
| 9th surface | K = −0.78018E+01 |
| | A4 = −0.63772E−01 |
| | A6 = 0.12885E−01 |
| | A8 = −0.23962E−02 |
| | A10 = 0.30047E−03 |
| | A12 = −0.15595E−04 |

Data of each single lens

| Lens | Starting surface | Focal length (mm) |
|---|---|---|
| 1 | 2 | 3.437 |
| 2 | 4 | −6.179 |
| 3 | 6 | 5.608 |
| 4 | 8 | −4.723 |

Values corresponding to conditional expressions (1), (2), (3), (4), (5), (6) and (7) for the image pickup lens in Example 4 are shown as follows.

$$r3/f=0.903 \quad (1)$$

$$v2=23.4 \quad (2)$$

$$(r1+r2)/(r1-r2)=-1.107 \quad (3)$$

$$(r3+r4)/(r3-r4)=2.935 \quad (4)$$

$$n2=1.632 \quad (5)$$

$$d6/f=0.197 \quad (6)$$

$$L/2Y=0.85 \quad (7)$$

In the Example 4, the first lens is made of glass material, and other lenses are made of plastic materials.

Figure 11:
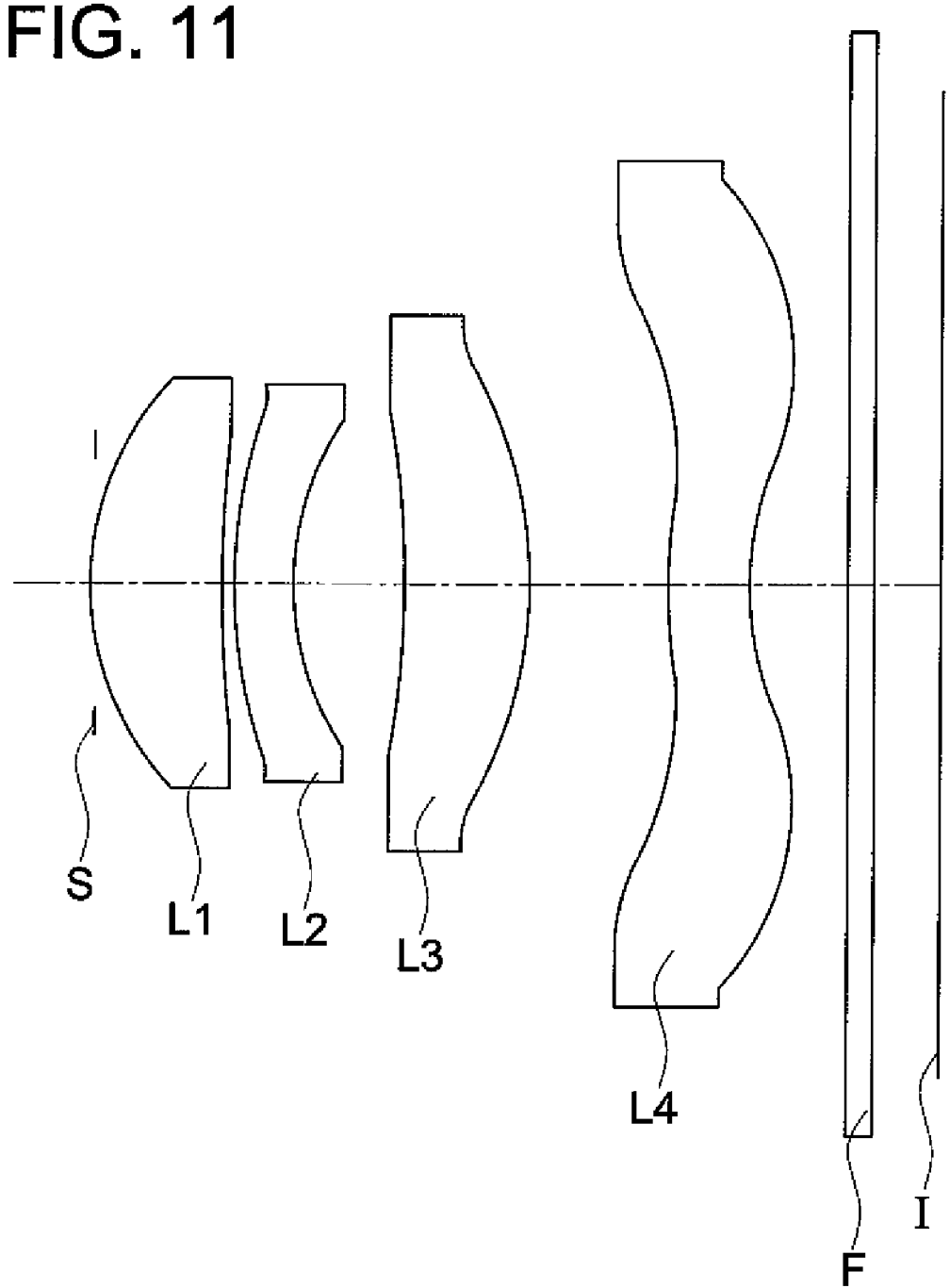
FIG. 11 shows a sectional view of the image pickup lens in Example 4.

FIG. 11 is a cross-sectional view of the image pickup lens in Example 4. There are shown aperture stop S, first lens L1, second lens L2, third lens L3, fourth lens L4 and parallel flat plate F that is assumed to be an optical lowpass filter, an infrared cut filter or a seal glass of a solid-state image pickup element, in this order from the object side along the optical axis, and I shows a position of an image pickup surface of the solid-state image pickup element.

FIG. 12 shows diagrams of aberrations (spherical aberration, astigmatism, distortion and meridional coma, respectively) of the image pickup lens shown in Example 4.

Example 5

Lens data of an image pickup lens in Example 5 is shown in the following Table 5.

TABLE 5 f = 3.92 mm fB = 0.44 mm F = 2.88 2Y = 5.67 mm ENTP = 0 mm
EXTP = −2.62 mm H1 = −1.09 mm H2 = −3.47 mm

| Surface No. | r (mm) | d (mm) | Nd | vd | Effective radius (mm) |
|---|---|---|---|---|---|
| 1 (diaphragm) | ∞ | 0.000 | | | 0.68 |
| 2* | 1.884 | 0.571 | 1.53420 | 54.4 | 0.82 |
| 3* | −6201.2 | 0.050 | | | 0.88 |
| 4* | 2.448 | 0.350 | 1.92270 | 18.9 | 0.94 |
| 5* | 1.543 | 0.700 | | | 0.93 |
| 6* | −22.525 | 1.042 | 1.53050 | 55.7 | 1.37 |
| 7* | −1.901 | 0.556 | | | 1.62 |
| 8* | 1.852 | 0.446 | 1.53050 | 55.7 | 2.25 |
| 9* | 0.943 | 0.550 | | | 2.48 |
| 10 | ∞ | 0.145 | 1.51630 | 64.1 | 2.63 |
| 11 | ∞ | | | | 2.67 |

Aspheric surface coefficient

| | |
|---|---|
| 2nd surface | K = 0.25715E+00 |
| | A4 = 0.80702E−02 |
| | A6 = −0.10690E−01 |
| | A8 = 0.41641E−01 |
| | A10 = −0.31403E−01 |
| 3rd surface | K = 0.15000E+02 |
| | A4 = 0.12093E−01 |
| | A6 = 0.69916E−01 |
| | A8 = −0.39289E−01 |
| | A10 = 0.28970E−01 |
| | A12 = −0.21737E−01 |
| 4th surface | K = −0.42222E+01 |
| | A4 = −0.17581E−01 |
| | A6 = 0.23599E−01 |
| | A8 = 0.23478E−01 |
| | A10 = −0.23496E−01 |
| 5th surface | K = −0.18064E+01 |
| | A4 = −0.80067E−02 |
| | A6 = 0.20425E−01 |
| | A8 = −0.32009E−03 |
| | A10 = 0.32502E−01 |
| | A12 = −0.25815E−01 |
| 6th surface | K = 0.15000E+02 |
| | A4 = −0.65225E−02 |
| | A6 = 0.30881E−01 |
| | A8 = −0.24496E−01 |
| | A10 = 0.11007E−01 |
| | A12 = −0.18578E−02 |
| 7th surface | K = −0.47382E+00 |
| | A4 = −0.26558E−02 |
| | A6 = 0.20616E−01 |
| | A8 = −0.24650E−02 |
| | A10 = 0.15783E−02 |
| | A12 = −0.38403E−03 |
| 8th surface | K = −0.19665E+02 |
| | A4 = −0.14241E+00 |
| | A6 = 0.46701E−01 |
| | A8 = −0.62757E−02 |
| | A10 = 0.38048E−03 |
| | A12 = −0.75131E−05 |
| 9th surface | K = −0.54601E+01 |
| | A4 = −0.61029E−01 |
| | A6 = 0.14760E−01 |
| | A8 = −0.28171E−02 |
| | A10 = 0.32434E−03 |
| | A12 = −0.14370E−04 |

Data of each single lens

| Lens | Starting surface | Focal length (mm) |
|---|---|---|
| 1 | 2 | 3.525 |
| 2 | 4 | −5.552 |
| 3 | 6 | 3.846 |
| 4 | 8 | −4.370 |

Values corresponding to conditional expressions (1), (2), (3), (4), (5), (6) and (7) for the image pickup lens in Example 5 are shown as follows.

$$r3/f=0.625 \quad (1)$$

$$v2=18.9 \quad (2)$$

$$(r1+r2)/(r1-r2)=-0.999 \quad (3)$$

$$(r3+r4)/(r3-r4)=4.408 \quad (4)$$

$$n2=1.923 \quad (5)$$

$d6/f=0.142$ (6)

$L/2Y=0.85$ (7)

In the Example 5, the second lens is made of glass material and other lenses are made of plastic materials.

Figure 13:
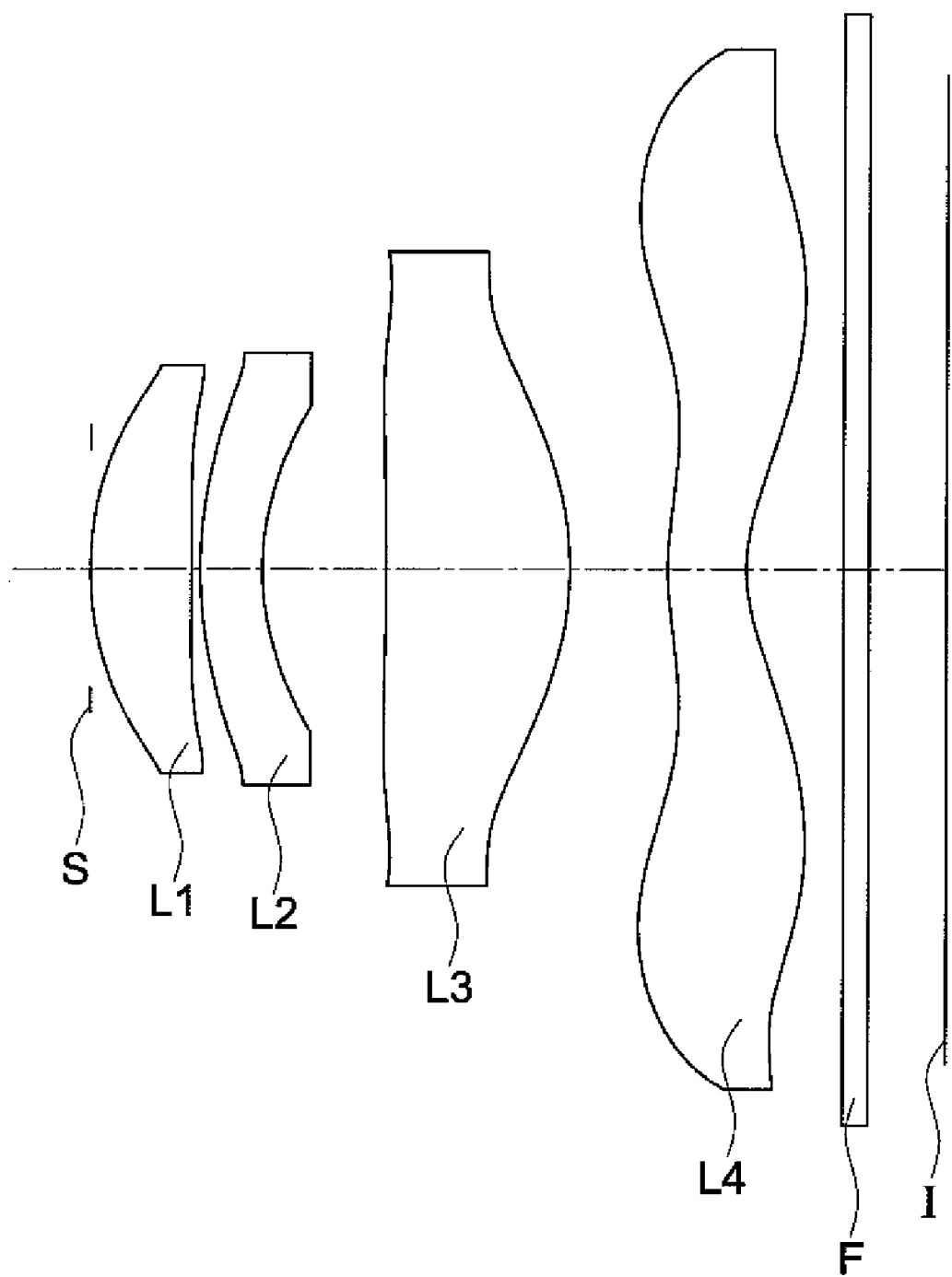
FIG. 13 shows a sectional view of the image pickup lens in Example 5.

FIG. 13 is a cross-sectional view of the image pickup lens in Example 5. There are shown aperture stop S, first lens L1, second lens L2 (third lens L3, fourth lens L4 and parallel flat plate F that is assumed to be an optical lowpass filter, an infrared cut filter or a seal glass of a solid-state image pickup element, in this order from the object side along the optical axis, and I shows a position of an image pickup surface of the solid-state image pickup element.

FIG. 14 shows diagrams of aberrations (spherical aberration, astigmatism, distortion and meridional coma, respectively) of the image pickup lens shown in Example 5.

Example 6

Lens data of an image pickup lens in Example 6 is shown in the following Table 6.

TABLE 6 f = 4.16 mm fB = 0.37 mm F = 2.88 2Y = 5.67 mm ENTP = 0 mm
EXTP = −2.58 mm H1 = −1.66 mm H2 = −3.77 mm

| Surface No. | r (mm) | d (mm) | Nd | νd | Effective radius (mm) |
|---|---|---|---|---|---|
| 1 (diaphragm) | ∞ | 0.000 | | | 0.72 |
| 2* | 1.891 | 0.610 | 1.53050 | 55.7 | 0.90 |
| 3* | −9.972 | 0.050 | | | 0.94 |
| 4* | 3.799 | 0.350 | 1.60700 | 26.8 | 0.98 |
| 5* | 1.525 | 0.736 | | | 1.00 |
| 6* | −16.136 | 0.763 | 1.53050 | 55.7 | 1.34 |
| 7* | −2.329 | 0.839 | | | 1.53 |
| 8* | 1.849 | 0.433 | 1.53050 | 55.7 | 2.21 |
| 9* | 0.994 | 0.550 | | | 2.46 |
| 10 | ∞ | 0.145 | 1.51630 | 64.1 | 2.68 |
| 11 | ∞ | | | | 2.72 |

| Aspheric surface coefficient | |
|---|---|
| 2nd surface | K = 0.12909E+00 |
| | A4 = 0.55379E-02 |
| | A6 = −0.17072E-01 |
| | A8 = 0.39373E-01 |
| | A10 = −0.16956E-01 |
| 3rd surface | K = −0.30000E+02 |
| | A4 = 0.47946E-01 |
| | A6 = 0.49825E-01 |
| | A8 = −0.57966E-01 |
| | A10 = 0.47743E-01 |
| | A12 = −0.65440E-02 |
| 4th surface | K = −0.53795E+01 |
| | A4 = −0.17755E-01 |
| | A6 = 0.32061E-01 |
| | A8 = 0.31155E-01 |
| | A10 = −0.24943E-01 |
| 5th surface | K = −0.23180E+01 |
| | A4 = −0.73053E-02 |
| | A6 = 0.31431E-01 |
| | A8 = −0.19856E-02 |
| | A10 = 0.29094E-01 |
| | A12 = −0.21411E-01 |
| 6th surface | K = −0.30000E+02 |
| | A4 = −0.72465E-02 |
| | A6 = 0.33067E-01 |
| | A8 = −0.25308E-01 |
| | A10 = 0.10763E-01 |
| | A12 = −0.19129E-02 |
| 7th surface | K = −0.66553E+00 |
| | A4 = −0.11095E-01 |
| | A6 = 0.25956E-01 |
| | A8 = −0.25126E-02 |
| | A10 = 0.11827E-02 |
| | A12 = −0.46577E-03 |
| 8th surface | K = −0.21496E+02 |
| | A4 = −0.14626E+00 |
| | A6 = 0.46613E-01 |
| | A8 = −0.62012E-02 |
| | A10 = 0.38395E-03 |
| | A12 = −0.88565E-05 |
| 9th surface | K = −0.66152E+01 |
| | A4 = −0.64449E-01 |
| | A6 = 0.14406E-01 |
| | A8 = −0.26522E-02 |
| | A10 = 0.31398E-03 |
| | A12 = −0.14971E-04 |

| Data of each single lens | | |
|---|---|---|
| Lens | Starting surface | Focal length (mm) |
| 1 | 2 | 3.051 |
| 2 | 4 | −4.455 |
| 3 | 6 | 5.034 |
| 4 | 8 | −4.912 | values corresponding to conditional expressions (1), (2), (3), (4), (5), (6) and (7) for the image pickup lens in Example 6 are shown as follows.

$r3/f=0.914$ (1)

$\nu 2=26.8$ (2)

$(r1+r2)/(r1-r2)=-0.681$ (3)

$(r3+r4)/(r3-r4)=2.341$ (4)

$n2=1.607$ (5)

$d6/f=0.202$ (6)

$L/2Y=0.85$ (7)

In the Example 6, all lenses are made of plastic materials.

Figure 15:
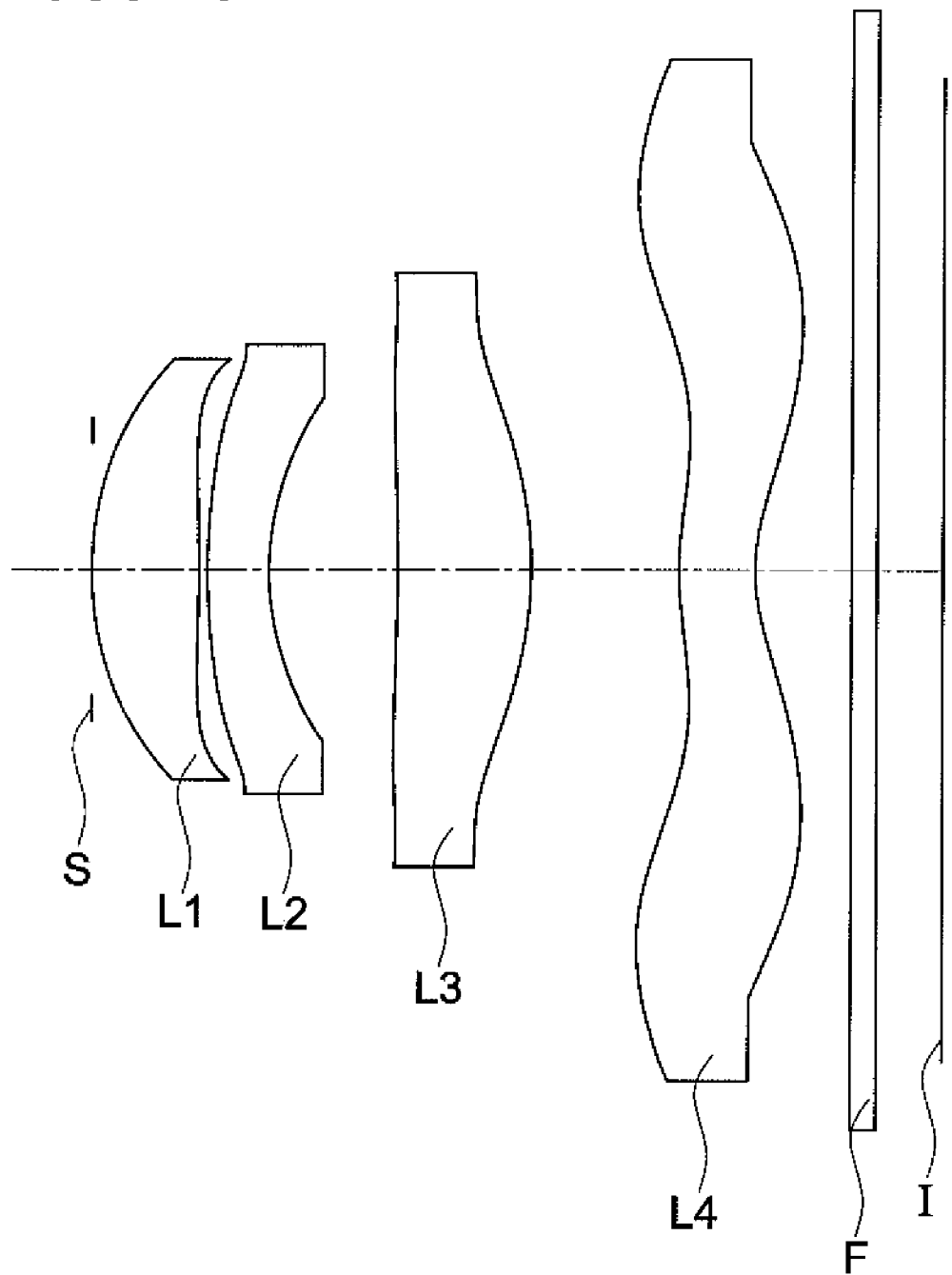
FIG. 15 shows a sectional view of the image pickup lens in Example 6.

FIG. 15 is a cross-sectional view of the image pickup lens in Example 6. There are shown aperture stop S, first lens L1, second lens L2, third lens L3, fourth lens L4 and parallel flat plate F that is assumed to be an optical lowpass filter, an infrared cut filter or a seal glass of a solid-state image pickup element, in this order from the object side along the optical axis, and I shows a position of an image pickup surface of the solid-state image pickup element.

FIG. 16 shows diagrams of aberrations (spherical aberration, astigmatism, distortion and meridional coma, respectively) of an image pickup lens shown in Example 6.

Example 7

Lens data of an image pickup lens in Example 7 is shown in the following Table 7.

TABLE 7 f = 3.94 mm fB = 0.44 mm F = 2.88 2Y = 5.67 mm ENTP = 0 mm
EXTP = −2.61 mm H1 = −1.15 mm H2 = −3.5 mm

| Surface No. | r (mm) | d (mm) | Nd | νd | Effective radius (mm) |
|---|---|---|---|---|---|
| 1 (diaphragm) | ∞ | 0.000 | | | 0.68 |

TABLE 7-continued

| | | | | | |
|---|---|---|---|---|---|
| 2* | 2.008 | 0.558 | 1.49740 | 81.2 | 0.80 |
| 3* | 21.721 | 0.163 | | | 0.89 |
| 4* | 2.270 | 0.350 | 1.92270 | 18.9 | 1.01 |
| 5* | 1.677 | 0.746 | | | 0.99 |
| 6* | −21.391 | 0.902 | 1.53050 | 55.7 | 1.44 |
| 7* | −1.813 | 0.533 | | | 1.64 |
| 8* | 2.343 | 0.466 | 1.53050 | 55.7 | 2.24 |
| 9* | 1.016 | 0.550 | | | 2.49 |
| 10 | ∞ | 0.145 | 1.51630 | 64.1 | 2.63 |
| 11 | ∞ | | | | 2.67 |

Aspheric surface coefficient

| | |
|---|---|
| $2^{nd}$ surface | K = −0.93391E−01 |
| | A4 = −0.10323E−02 |
| | A6 = −0.12351E−01 |
| | A8 = 0.26007E−01 |
| | A10 = −0.22452E−01 |
| $3^{rd}$ surface | K = −0.30000E+02 |
| | A4 = −0.57819E−01 |
| | A6 = 0.80889E−01 |
| | A8 = −0.12372E−01 |
| | A10 = −0.31942E−01 |
| | A12 = 0.11120E−01 |
| $4^{th}$ surface | K = −0.52220E+01 |
| | A4 = −0.22586E−01 |
| | A6 = 0.26655E−01 |
| | A8 = 0.37551E−01 |
| | A10 = −0.26833E−01 |
| $5^{th}$ surface | K = −0.19102E+01 |
| | A4 = −0.10494E−01 |
| | A6 = 0.18284E−01 |
| | A8 = 0.14111E−01 |
| | A10 = 0.30821E−01 |
| | A12 = −0.27893E−01 |
| $6^{th}$ surface | K = −0.30000E+02 |
| | A4 = −0.26855E−02 |
| | A6 = 0.25176E−01 |
| | A8 = −0.24321E−01 |
| | A10 = 0.10912E−01 |
| | A12 = −0.16760E−02 |
| $7^{th}$ surface | K = −0.59368+00 |
| | A4 = 0.19394E−01 |
| | A6 = 0.14763E−01 |
| | A8 = −0.32041E−02 |
| | A10 = 0.18591E−02 |
| | A12 = −0.40152E−03 |
| $8^{th}$ surface | K = −0.30000E+02 |
| | A4 = −0.13194E+00 |
| | A6 = 0.45420E−01 |
| | A8 = −0.63441E−02 |
| | A10 = 0.39685E−03 |
| | A12 = −0.84042E−05 |
| $9^{th}$ surface | K = −0.53652E+01 |
| | A4 = −0.62261E−01 |
| | A6 = 0.15885E−01 |
| | A8 = −0.29280E−02 |
| | A10 = 0.32219E−03 |
| | A12 = −0.14313E−04 |

Data of each single lens

| Lens | Starting surface | Focal length (mm) |
|---|---|---|
| 1 | 2 | 4.408 |
| 2 | 4 | −9.691 |
| 3 | 6 | 3.675 |
| 4 | 8 | −3.848 |

Values corresponding to conditional expressions (1), (2), (3), (4), (5), (6) and (7) for the image pickup lens in Example 7 are shown as follows $$r3/f=0.576 \quad (1)$$

$$v2=18.9 \quad (2)$$

$$(r1+r2)/(r1-r2)=-1.204 \quad (3)$$

$$(r3+r4)/(r3-r4)=6.656 \quad (4)$$

$$n2=1.923 \quad (5)$$

$$d6/f=0.135 \quad (6)$$

$$L/2Y=0.85 \quad (7)$$

In the Example 7, the first lens and the second lens are made of glass materials and the third lens and the fourth lens are made of plastic material.

Figure 17:
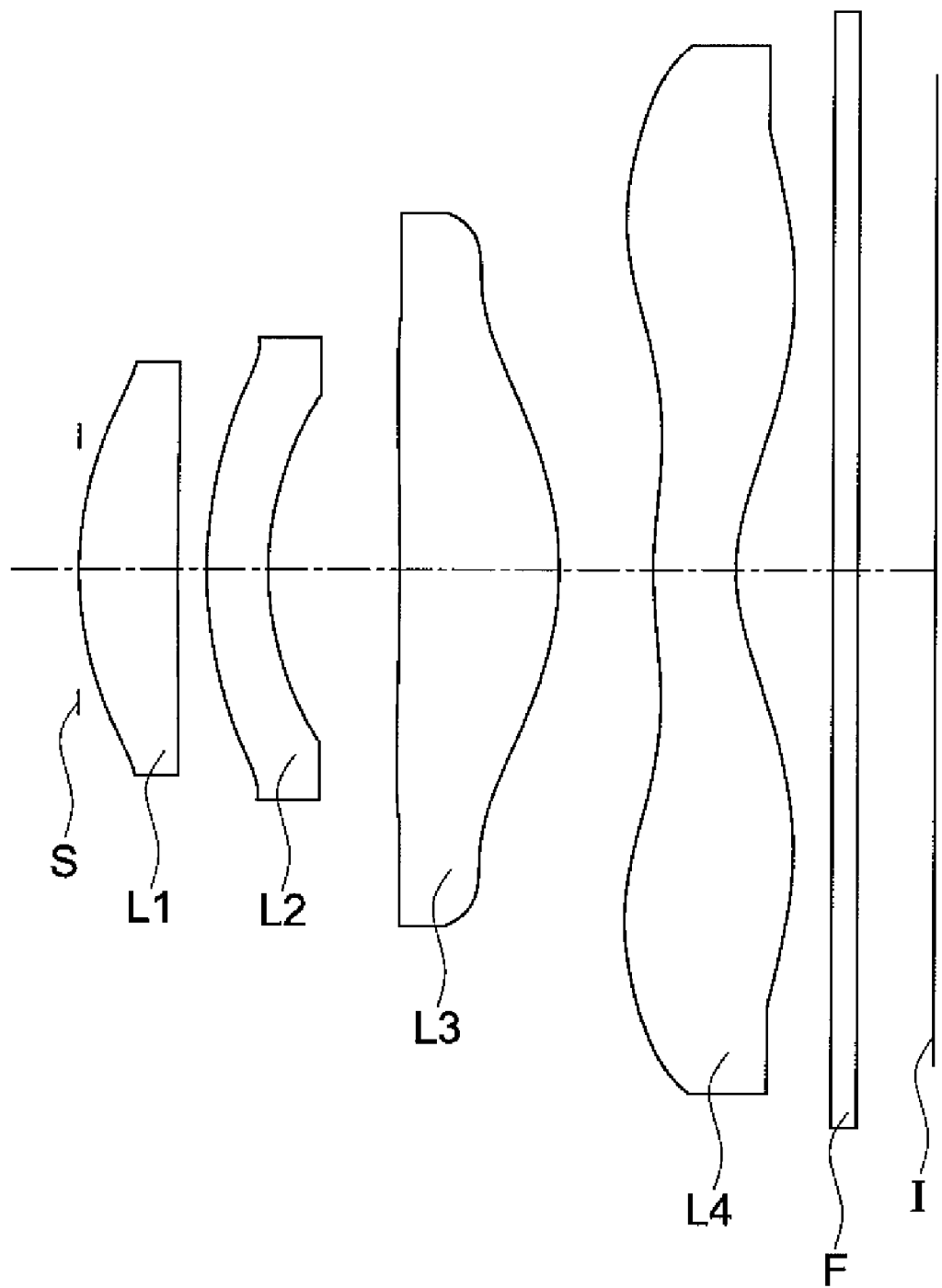
FIG. 17 shows a sectional view of the image pickup lens in Example 7.

FIG. 17 is a cross-sectional view of the image pickup lens in Example 7. There are shown aperture stop S, first lens L1, second lens L2, third lens L3, fourth lens L4 and parallel flat plate F that is assumed to be an optical lowpass filter, an infrared cut filter or a seal glass of a solid-state image pickup element, in this order from the object side along the optical axis, and I shows a position of an image pickup surface of the solid-state image pickup element.

FIG. 18 shows diagrams of aberrations (spherical aberration, astigmatism, distortion and meridional coma, respectively) of an image pickup lens shown in Example 7.

Incidentally, each of the above Examples is not necessarily designed such that an incident angle of a principal ray of the light flux that enters an image pickup surface of a solid-state image pickup element is sufficiently small at a peripheral portion of the image pickup surface. In the recent technology, it has become possible to reduce shading by a revision of an arrangement of a color filter of a solid-state image pickup element and an onchip-microlens-array. Specifically, if a pitch of the arrangement of the color filter and the onchip-microlens-array is designed to be slightly smaller compared with a pixel pitch of the image pickup surface of the image pickup element, a light flux of oblique incidence can be guided efficiently, because the color filter and the onchip-microlens-array are shifted greater toward an optical axis of an image pickup lens at the position which is closer to a peripheral portion of the image pickup surface. Owing to this, shading generated on the solid-state image pickup element can be controlled to be small. The present Examples provide design examples in which the above design requirement about the incident angle of the principal ray is lighten and the design requirement for downsizing is stronger.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An image pickup lens for forming an image of a subject onto a photoelectric converter of a solid-state image pickup element, the image pickup lens comprising, in order from an object side thereof:
    an aperture stop;
    a first lens with a positive refractive power;
    a second lens in a meniscus shape with a negative refractive power, whose object side surface is a convex surface;
    a third lens with a positive refractive power; and
    a fourth lens with a negative refractive power,
    wherein the image pickup lens satisfies the following expressions:

$$0.4<r3/f<0.92, 15<v2<27,$$

where r3 is a curvature radius of the object side surface of the second lens, f is a focal length of a total system of the image pickup lens, and v2 is an Abbe number of the second lens.

2. The image pickup lens of claim 1, wherein the image pickup lens satisfies the following expressions:

$$-1.0<(r1+r2)/(r1-r2)<-0.3, 2.0<(r3+r4)/(r3-r4)<5.0,$$

where r1 is a paraxial curvature radius of an object side surface of the first lens, r2 is a paraxial curvature radius of an image side surface of the first lens, r3 is a paraxial curvature radius of the object side surface of the second lens, and r4 is a paraxial curvature radius of an image side surface of the second lens.

3. The image pickup lens of claim 1, wherein the image pickup lens satisfies the following expression:

$$1.60<n2<2.10,$$

where n2 is a refractive index of the second lens at d-line.

4. The image pickup lens of claim 1, wherein an object side surface of the fourth lens is formed in an aspheric shape, and the image pickup lens satisfies the following expression:

$$0.05<d6/f<0.4,$$

where d6 is an air distance along an optical axis between the third lens and the fourth lens.

5. The image pickup lens of claim 1, wherein the fourth lens is a meniscus lens whose object side surface is a convex surface.

6. The image pickup lens of claim 1, wherein an image side surface of the fourth lens is formed in an aspheric shape on which a center portion has a negative refractive power and the negative refractive power becomes smaller at a position being closer to a periphery, and the image side surface of the fourth lens includes an inflection point.

7. The image pickup lens of claim 1, wherein at least one of the first lens and the second lens comprises a glass material.

8. The image pickup lens of claim 1, wherein each of the first, second, third, and fourth lenses comprises a plastic material.

9. An image pickup apparatus, comprising:
a solid-state image pickup element for photo-electrically converting an image of a subject, and
the image pickup lens of claim 1.

10. A mobile terminal, comprising:
the image pickup apparatus of claim 9.

* * * * *